(12) United States Patent
Conrad et al.

(10) Patent No.: US 9,820,431 B2
(45) Date of Patent: Nov. 21, 2017

(54) SYSTEM AND PROCESS FOR DISPENSING MULTIPLE AND LOW RATE AGRICULTURAL PRODUCTS

(71) Applicant: AMERICAN VANGUARD CORPORATION, Newport Beach, CA (US)

(72) Inventors: Larry M. Conrad, Walker, IA (US); Rex A. Rysdam, Bloomfield, IA (US); Nathaniel R. Claussen, Golden Valley, MN (US); Richard M. Porter, Ankeny, IA (US)

(73) Assignee: AMERICAN VANGUARD CORPORATION, Newport Beach, CA (US)

( * ) Notice: Subject to any disclaimer, the term of this patent is extended or adjusted under 35 U.S.C. 154(b) by 214 days.

(21) Appl. No.: 14/521,908

(22) Filed: Oct. 23, 2014

(65) Prior Publication Data
US 2015/0059626 A1 Mar. 5, 2015

Related U.S. Application Data

(63) Continuation-in-part of application No. 14/468,973, filed on Aug. 26, 2014, now abandoned.
(Continued)

(51) Int. Cl.
*A01C 7/06* (2006.01)
*A01C 21/00* (2006.01)
(Continued)

(52) U.S. Cl.
CPC .............. *A01C 21/005* (2013.01); *A01C 7/06* (2013.01); *A01M 7/0092* (2013.01); *A01M 9/0092* (2013.01); *A01C 23/007* (2013.01)

(58) Field of Classification Search
USPC ......................................................... 701/50
See application file for complete search history.

(56) References Cited

U.S. PATENT DOCUMENTS 4,009,668 A * 3/1977 Brass ....................... A01C 5/06
                                                                 111/137
4,497,265 A * 2/1985 Hood, Jr. ................ A01C 7/08
                                                                 111/177
(Continued)

FOREIGN PATENT DOCUMENTS

EP          2469999 A1     7/2012
EP          2469999 B1     9/2014
(Continued)

OTHER PUBLICATIONS

International Application No. PCT/US2014/061972 International Search Report and Written Opinion of the International Searching Authority dated March 24, 2015 Attached to International Publication No. WO 2015/061570 A1 (17 Pages).
(Continued)

*Primary Examiner* — Alicia Torres
(74) *Attorney, Agent, or Firm* — Lawrence N. Ginsberg

(57) ABSTRACT

A system for dispensing agricultural products includes: a master controller, sets of agricultural product containers, meter devices, and secondary controllers. The meter devices are operatively connected to the product containers and configured to dispense products from the containers to rows in a field wherein each of the sets of containers is associated with a respective row in the field. The secondary controllers actuate the meter devices. Each secondary controller receives command data from the master controller and controls the meter devices for dispensing in response to the command data. Agricultural product from each product container is dispensed in accordance with operator defined instructions to the master controller. The instructions are
(Continued)

capable of being provided to the master controller during the planting allowing the dispensing of individual containers to be controlled. In one embodiment the invention is a process for dispensing agricultural products at low application rates utilizing precision placement equipment.

34 Claims, 13 Drawing Sheets

Related U.S. Application Data

(60) Provisional application No. 61/870,667, filed on Aug. 27, 2013, provisional application No. 61/895,803, filed on Oct. 25, 2013, provisional application No. 62/048,628, filed on Sep. 10, 2014.

(51) Int. Cl.
*A01M 9/00* (2006.01)
*A01M 7/00* (2006.01)
*A01C 23/00* (2006.01)

(56) References Cited

U.S. PATENT DOCUMENTS

| | | | |
|---|---|---|---|
| 4,522,340 A | 6/1985 | Gandrud | |
| 4,529,073 A | 7/1985 | Lewis et al. | |
| 4,611,606 A | 9/1986 | Hall et al. | |
| 4,691,645 A * | 9/1987 | Anderson | A01C 5/06 111/147 |
| 4,705,220 A | 11/1987 | Gandrud et al. | |
| 4,896,615 A * | 1/1990 | Hood, Jr. | A01C 7/16 111/177 |
| 4,917,304 A | 4/1990 | Mazzei et al. | |
| 4,971,255 A | 11/1990 | Conrad | |
| 5,024,173 A | 6/1991 | Deckler | |
| 5,029,624 A | 7/1991 | McCunn et al. | |
| 5,060,701 A | 10/1991 | McCunn et al. | |
| 5,125,438 A | 6/1992 | McCunn et al. | |
| 5,220,876 A | 6/1993 | Monson et al. | |
| 5,224,577 A | 7/1993 | Falck et al. | |
| 5,379,812 A | 1/1995 | McCunn et al. | |
| 5,524,794 A | 6/1996 | Benedetti, Jr. et al. | |
| 5,539,669 A | 7/1996 | Goeckner et al. | |
| 5,638,285 A | 6/1997 | Newton | |
| 5,641,011 A | 6/1997 | Benedetti | |
| 5,687,782 A | 11/1997 | Cleveland et al. | |
| 5,737,221 A | 4/1998 | Newton | |
| 5,931,882 A | 8/1999 | Fick et al. | |
| 6,122,581 A | 9/2000 | McQuinn et al. | |
| 6,198,986 B1 | 3/2001 | McQuinn | |
| 6,748,884 B1 | 6/2004 | Bettin et al. | |
| 6,938,564 B2 | 9/2005 | Conrad et al. | |
| 7,171,912 B2 | 2/2007 | Fraisse et al. | |
| 7,171,913 B1 * | 2/2007 | Conrad | A01C 7/105 111/174 |
| 7,270,065 B2 | 9/2007 | Conrad | |
| 7,317,988 B2 | 1/2008 | Johnson | |
| 7,380,733 B2 | 6/2008 | Owenby et al. | |
| 7,694,638 B1 | 4/2010 | Riewerts et al. | |
| 7,916,022 B2 | 3/2011 | Wilcox et al. | |
| 8,024,074 B2 | 9/2011 | Stelford et al. | |
| 8,141,504 B2 | 3/2012 | Dean et al. | |
| 8,322,293 B2 | 12/2012 | Wollenhaupt et al. | |
| 8,336,470 B2 | 12/2012 | Rans | |
| 8,371,239 B2 | 2/2013 | Rans et al. | |
| 8,371,240 B2 | 2/2013 | Wollenhaupt et al. | |
| 8,504,234 B2 | 8/2013 | Anderson | |
| 8,504,310 B2 | 8/2013 | Landphair et al. | |
| 8,517,230 B2 | 8/2013 | Memory | |
| 8,600,629 B2 | 12/2013 | Zielke | |
| 8,781,693 B2 | 7/2014 | Woodcock | |
| 8,825,263 B1 | 9/2014 | Nelson, Jr. | |
| 8,868,300 B2 | 10/2014 | Kocer et al. | |
| 8,924,099 B2 | 12/2014 | Nelson, Jr. | |
| 9,113,591 B2 | 8/2015 | Shivak | |
| 2003/0226484 A1 * | 12/2003 | O'neall | A01C 7/208 111/173 |
| 2004/0231575 A1 | 11/2004 | Wilkerson et al. | |
| 2006/0026499 A1 | 2/2006 | Weddle | |
| 2007/0043529 A1 | 2/2007 | Johnson | |
| 2007/0193483 A1 * | 8/2007 | Conrad | A01C 7/06 111/200 |
| 2007/0266917 A1 * | 11/2007 | Riewerts | A01C 7/046 111/200 |
| 2010/0101466 A1 | 4/2010 | Riewerts et al. | |
| 2010/0282141 A1 | 11/2010 | Wollenhaupt et al. | |
| 2010/0282143 A1 | 11/2010 | Preheim et al. | |
| 2010/0282144 A1 | 11/2010 | Rans et al. | |
| 2010/0282147 A1 | 11/2010 | Wollenhaupt et al. | |
| 2011/0035055 A1 | 2/2011 | Applegate et al. | |
| 2011/0054743 A1 | 3/2011 | Kocer et al. | |
| 2012/0010789 A1 * | 1/2012 | Dulnigg | A01G 1/00 701/50 |
| 2012/0042815 A1 | 2/2012 | Wonderlich | |
| 2013/0030565 A1 | 1/2013 | Zielke | |
| 2013/0061789 A1 | 3/2013 | Binsirawanich et al. | |
| 2013/0061790 A1 | 3/2013 | Binsirawanich et al. | |
| 2013/0085598 A1 | 4/2013 | Kowalchuk | |
| 2013/0152835 A1 * | 6/2013 | Stevenson | A01C 5/00 111/163 |
| 2013/0192503 A1 * | 8/2013 | Henry | A01C 7/082 111/174 |
| 2013/0238200 A1 | 9/2013 | Woodcock | |
| 2013/0333601 A1 | 12/2013 | Shivak | |
| 2014/0026792 A1 * | 1/2014 | Bassett | A01C 7/208 111/121 |
| 2014/0252111 A1 | 9/2014 | Michael et al. | |
| 2014/0263705 A1 | 9/2014 | Michael et al. | |
| 2014/0263708 A1 | 9/2014 | Thompson et al. | |
| 2014/0263709 A1 | 9/2014 | Kocer et al. | |
| 2014/0277780 A1 | 9/2014 | Jensen et al. | |
| 2014/0277954 A1 | 9/2014 | Nelson, Jr. | |
| 2014/0284400 A1 | 9/2014 | Hebbert et al. | |
| 2015/0094916 A1 | 4/2015 | Bauerer et al. | |
| 2015/0097707 A1 | 4/2015 | Nelson, Jr. et al. | |
| 2015/0112557 A1 | 4/2015 | Nelson, Jr. | |
| 2015/0257331 A1 | 9/2015 | Shivak | |
| 2015/0334912 A1 | 11/2015 | Sauder et al. | |

FOREIGN PATENT DOCUMENTS

| | | |
|---|---|---|
| EP | 2861355 A2 | 4/2015 |
| WO | 2011025592 A1 | 3/2011 |
| WO | 2013191990 A2 | 12/2013 |
| WO | 2014018717 A1 | 1/2014 |
| WO | 2013191990 A3 | 2/2014 |
| WO | 2014183182 A1 | 11/2014 |

OTHER PUBLICATIONS

Screenshot from http:/www.amvacsmartbox.com/AboutSmartBox/AboutSmartBox/tabid/103/Default.aspx , downloaded on Sep. 23, 2016 (1 Page).
European Application No. EP-14 85 5768.9, European Extended Search Report and Written Opinion of the European Searching Authority dated May 10, 2017 Attached to Pursuant to Rule 62 EPC and Cited References (92 Pages).
Screenshot from http://www.amvacsmartbox.com/Portals/0/Guides/DropTubes/Drop%20Tube%20-%20John%20Deere%20-%20Reart%20Mount.PD, downloaded on Jul. 13, 2017 (1 Page).

* cited by examiner

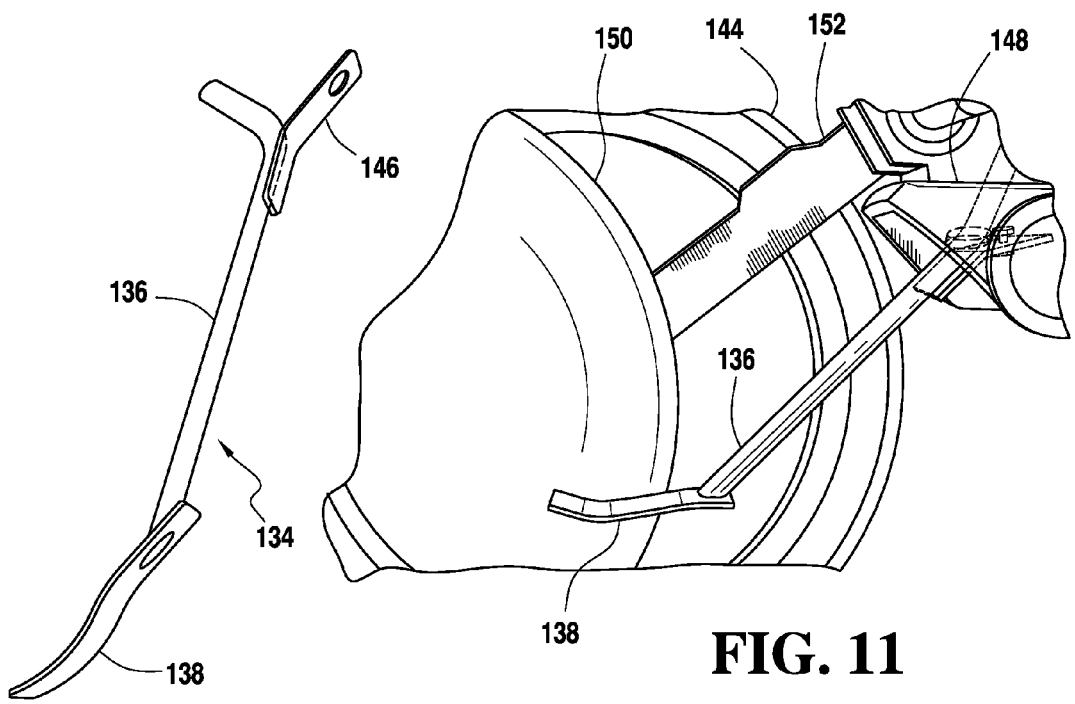
FIG. 10
FIG. 11
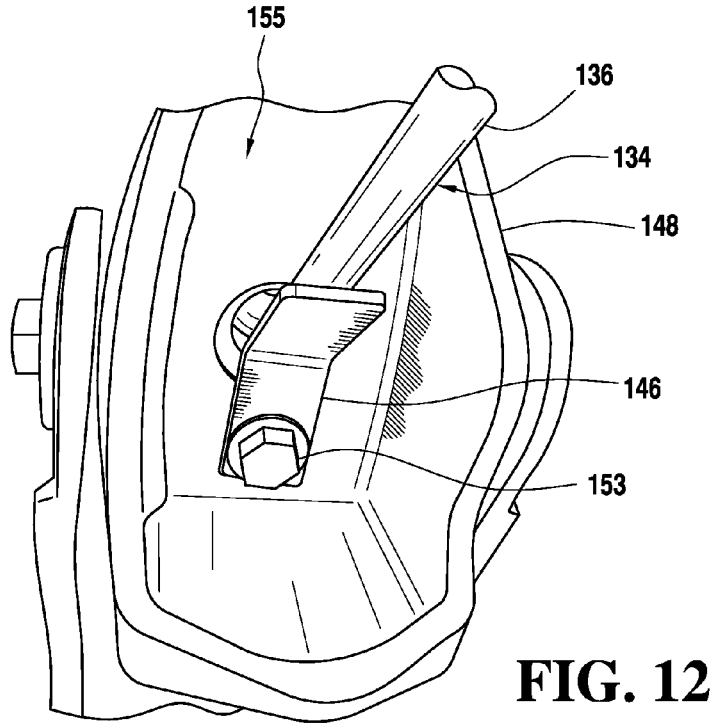
FIG. 12

FIG. 17
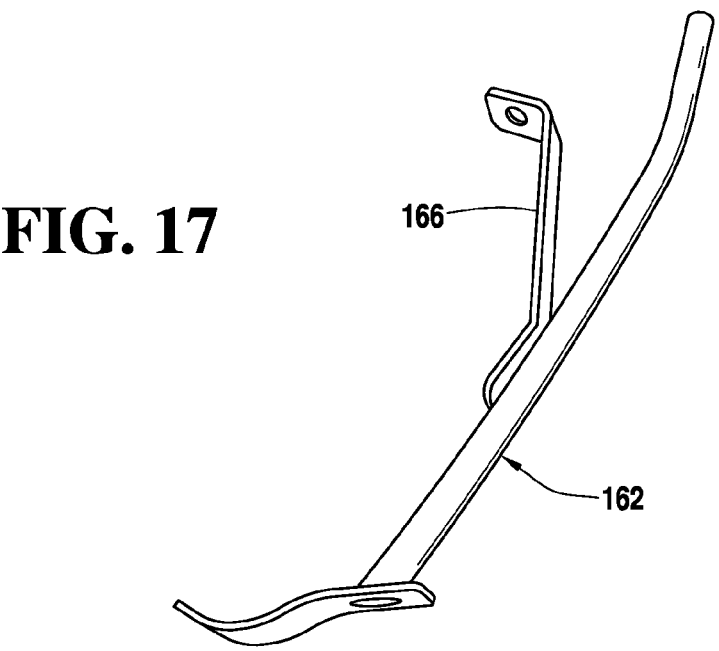
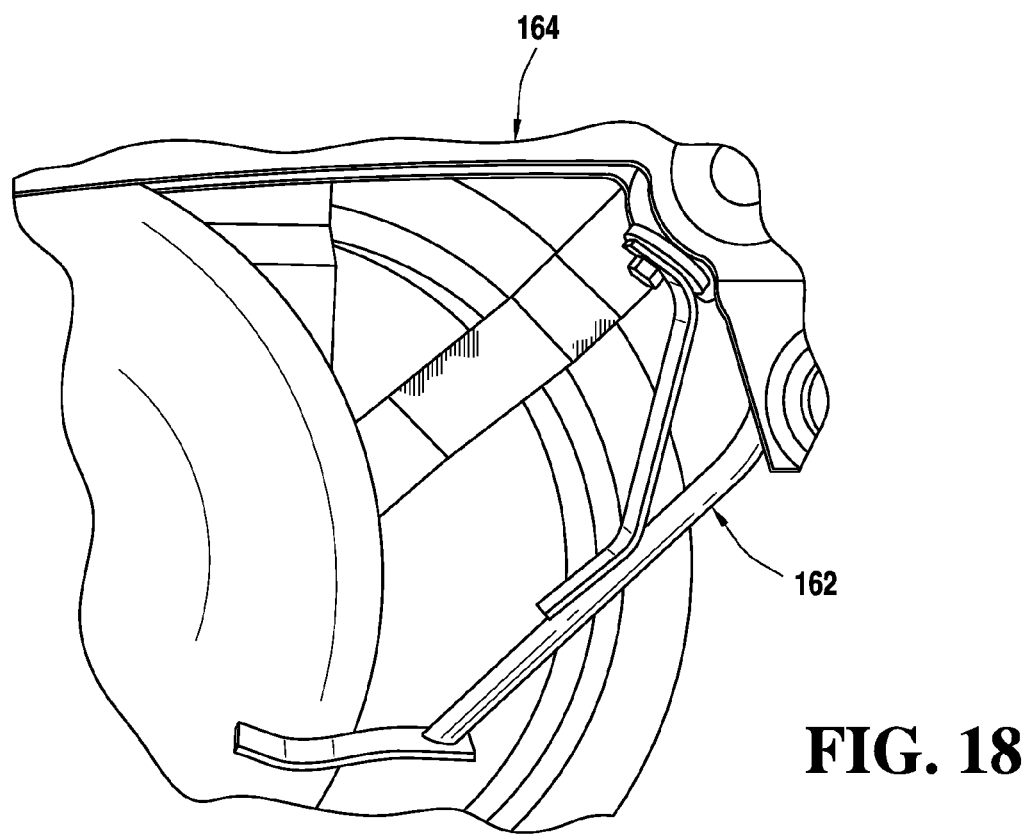
FIG. 18

SYSTEM AND PROCESS FOR DISPENSING MULTIPLE AND LOW RATE AGRICULTURAL PRODUCTS

CROSS REFERENCE TO RELATED APPLICATIONS

The present application is a continuation in part of U.S. application Ser. No. 14/468,973, filed Aug. 26, 2014, entitled SYSTEM FOR DISPENSING AGRICULTURAL PRODUCTS IN SPECIFIED GROUPINGS which claims benefit of U.S. Provisional Application No. 61/870,667 filed Aug. 27, 2013, entitled SYSTEM FOR DISPENSING AGRICULTURAL PRODUCTS IN SPECIFIED GROUPINGS.

This patent application also claims the benefit of U.S. Provisional Application No. 61/895,803, filed Oct. 25, 2013, entitled SYSTEM FOR DISPENSING MULTIPLE AGRICULTURAL PRODUCTS AT PLANTING.

This patent application also claims the benefit of U.S. Provisional Application No. 62/048,628, filed Sep. 10, 2014, entitled SYSTEM AND PROCESS FOR DISPENSING AGRICULTURAL PRODUCTS AT A LOW RATE.

The entire contents of Ser. No. 14/468,973, 61/870,667, 61/895,803, and 62/048,628 are each hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to material delivery systems for agricultural products, including fertilizers, nutrients, crop protection chemicals, biologicals, plant growth regulators; and, more particularly to material dispensing systems using distributed processing.

2. Description of the Related Art

In markets requiring the usage of chemicals, often hazardous substances, the Environmental Protection Agency and other regulatory bodies are imposing stricter regulations on the transportation, handling, dispersion, disposal, and reporting of actual usage of chemicals. These regulations, along with public health concerns, have generated a need for products that address these issues dealing with proper chemical handling.

To reduce the quantity of chemicals handled, the concentration of the chemical, as applied, has been increasing. This has raised the cost of chemicals per unit weight and has also required more accurate dispensing systems. For example, typical existing systems for agricultural product dispensing use a mechanical chain driven dispenser. Normal wear and tear on these mechanical dispensers can alter the rate of product applied by as much as 15%. For one typical chemical, Force®, a pyrethroid type insecticide by Syngenta Crop Protection, an over-application rate of 15% can increase the cost of the insecticide by $1500 over 500 acres and may contribute or cause unwanted crop response, such as plant phytotoxicity or unregistered amounts of pesticide residues in or on the crop.

Since many of the current agricultural product systems are mechanical systems, any record keeping and reporting must generally be kept manually.

The foregoing illustrates limitations known to exist in many present material delivery systems. Thus, it is apparent that it would be advantageous to provide an alternative directed to overcoming one or more of the limitations set forth above. Accordingly, a suitable alternative is provided, including features more fully disclosed hereinafter.

Over the past decade, planting and chemical dispensing systems for dispensing seed and insecticides, herbicides, fungicides, nutrients, plant growth regulators, or fertilizers, have made the handling of seed and chemical liquids or granules less hazardous to the agricultural worker by providing closed container systems, such as those described in U.S. Pat. No. 5,301,848 and U.S. Pat. No. 4,971,255, incorporated by reference herein and the SmartBox® Dispensing System (hereinafter "SmartBox Dispensing System"), marketed by AMVAC Chemical Corporation, a division of American Vanguard Corporation. Briefly, as described in U.S. Pat. No. 5,301,848, access to and from a container in a closed container system is available through a single opening in the bottom wall of the container, offering distinct advantages over an open-top, non-removable container design in an open container system.

Closed container systems provide a removable container, which is pre-filled with the chemical or toxic materials such as insecticides, fertilizers, herbicides and other pesticides; or other agricultural products, thereby eliminating the need to open and pour bags of chemical products into storage hoppers. Since the closed container system is largely not open to the air, agricultural workers have less opportunity to come into contact with the chemical products, thereby reducing skin and inhalation exposure to the hazardous chemicals.

Currently, there is an industry program to double corn yields in 20 years through use of new technology. At the present time, most products that are applied at planting are insecticides for the treatment of nematodes, and soil insects, such as corn rootworm, and secondary insect pests; herbicides for the control of weeds in the seed zone; fungicides for the control of diseases and improving plant health; nutrients for improving plant health, etc. There is research being conducted for other products such as biological products, fertility products, fungicides, micro-nutrients, growth stimulants, the new area of RNA silencing or interference gene technology, etc.

Additionally, a steady decline in the overall honeybee population year to year is a growing problem worldwide. It has been reported that the air vacuum planters exhaust the insecticide dust from the treated seed thereby affecting the bee population. This effect on non-target species could be potentially reduced in a closed system.

Today, most granular products for pest control at planting time are dispensed at a rate above three ounces per thousand feet of row. Bigger planters and distribution issues make it desirable for a more concentrated product to be applied at lower rates. Because of application issues, special techniques and special equipment are required to provide proper application so these granular products can perform effectively. As will be disclosed below, the present invention addresses these needs.

Conventional systems, for granule placement in-furrow, use a plastic hose and metal bracket. Wind and side hills may affect product placement. Because they are placed behind the depth wheels the brackets are constantly being misaligned by coming into contact with crop residue, clods, and other field issues such as ditches and furrows. Also, since the furrow closure is determined by soil conditions, the furrow may be closed by the time the chemical tube applies the chemical to the furrow. Normally product is placed behind the depth wheels in such a manner that the wind can blow the product off target under windy conditions prevalent during planting time. With conventional banding equipment, the product is placed on the downhill side of the row on side hills. OEM banding equipment is often times too wide and offers no protection from the wind, which may not let the product be placed in the desired application zone.

SUMMARY OF THE INVENTION

In one aspect, the present invention is embodied as a system for dispensing agricultural products including: a) a master controller; b) a plurality of sets of agricultural product containers; c) a plurality of meter devices operatively connected to said product containers and configured to dispense agricultural products at metered rates from said containers to rows in a field wherein each of said sets of agricultural product containers is associated with a respective row in the field; and, d) a plurality of secondary controllers for actuating the plurality of meter devices, each secondary controller receiving command data from the master controller and controlling the meter devices for dispensing in response to said command data. Agricultural product from each agricultural product container is dispensed in accordance with operator defined instructions to the master controller. The instructions are capable of being provided to the master controller during the planting allowing the dispensing of individual containers to be controlled.

Various combinations of products at planting with multiple containers can be applied with this technology.

In another aspect, the present invention is embodied as a process for dispensing agricultural products at a low application rate. The process includes the steps of providing product containers containing low application rate, dry, granular agricultural products. The product containers are utilized to maintain product integrity during shipping and storage. Low application rate meter devices are operatively connected to the product containers and are configured to dispense the agricultural products from the plurality of product containers. The meter devices are mounted on planters. The low application rate is defined as a rate below 3 ounces per 1000 feet of row. Precision placement equipment is operatively connected to the plurality of low rate meter devices to place the low usage rate agricultural products in the desired locations for efficient activity of the agricultural products. Low application rate meter devices and the precision placement equipment are operated to dispense the agricultural products at an optimized efficiency. This maximizes the protection against pests and thereby increases yield.

The application rate range of the present invention provides for a convenient package for handling and shipping. The containers are smaller and lighter than presently used containers. Manufacturing and shipping costs are reduced. Furthermore, there is less volume of product resulting in reduced storage and handling requirements related to the product for the grower.

In some embodiments the product containers are rigid. In some embodiments the product containers may be disposable. (If disposable product containers are used the containers are utilized in conjunction with one or more configurable, rigid product reservoir.)

In an embodiment the low application rate is 1.0-2.0 ounces per 1000 feet of row. In an embodiment the agricultural products are insecticides.

In one embodiment the low application rate is 2.0-2.99 ounces per 1000 feet of row. In another embodiment the low application rate is below 2.0 ounces per 1000 feet of row. In another embodiment the low application rate is 0.01-1.9 ounces per 1000 feet of row.

The precision placement equipment typically comprises placement tube assemblies. Each placement tube assembly is mounted for placement of product in-furrow between depth wheels of a depth control wheel assembly of the planter. The precision placement equipment typically comprises banders. Each bander is mounted behind a depth control wheel assembly and foreword of a closing wheel assembly of the planter. Each bander preferably includes a wind screen positioned thereon.

BRIEF DESCRIPTION OF THE DRAWINGS

FIG. 10 is a perspective illustration of the placement tube assembly of the FIG. 9 low application rate dispensing planter row unit.

FIG. 11 is a side perspective view of a portion of the low application rate dispensing planter row unit of FIG. 9, showing connection of the rear mounted placement tube assembly to the frame of the dispensing planter row unit.

FIG. 12 is a view taken from underneath the portion of FIG. 11 to illustrate the manner in which the placement tube assembly is attached.

FIG. 17 is a perspective illustration of another embodiment of a rear mounted placement tube assembly.

FIG. 18 illustrates the manner in which the rear mounted placement tube assembly of FIG. 17 is mounted to the frame of a dispensing planter row unit.

The same elements or parts throughout the figures of the drawings are designated by the same reference characters, while equivalent elements bear a prime designation.

DETAILED DESCRIPTION OF THE INVENTION

Figure 1:
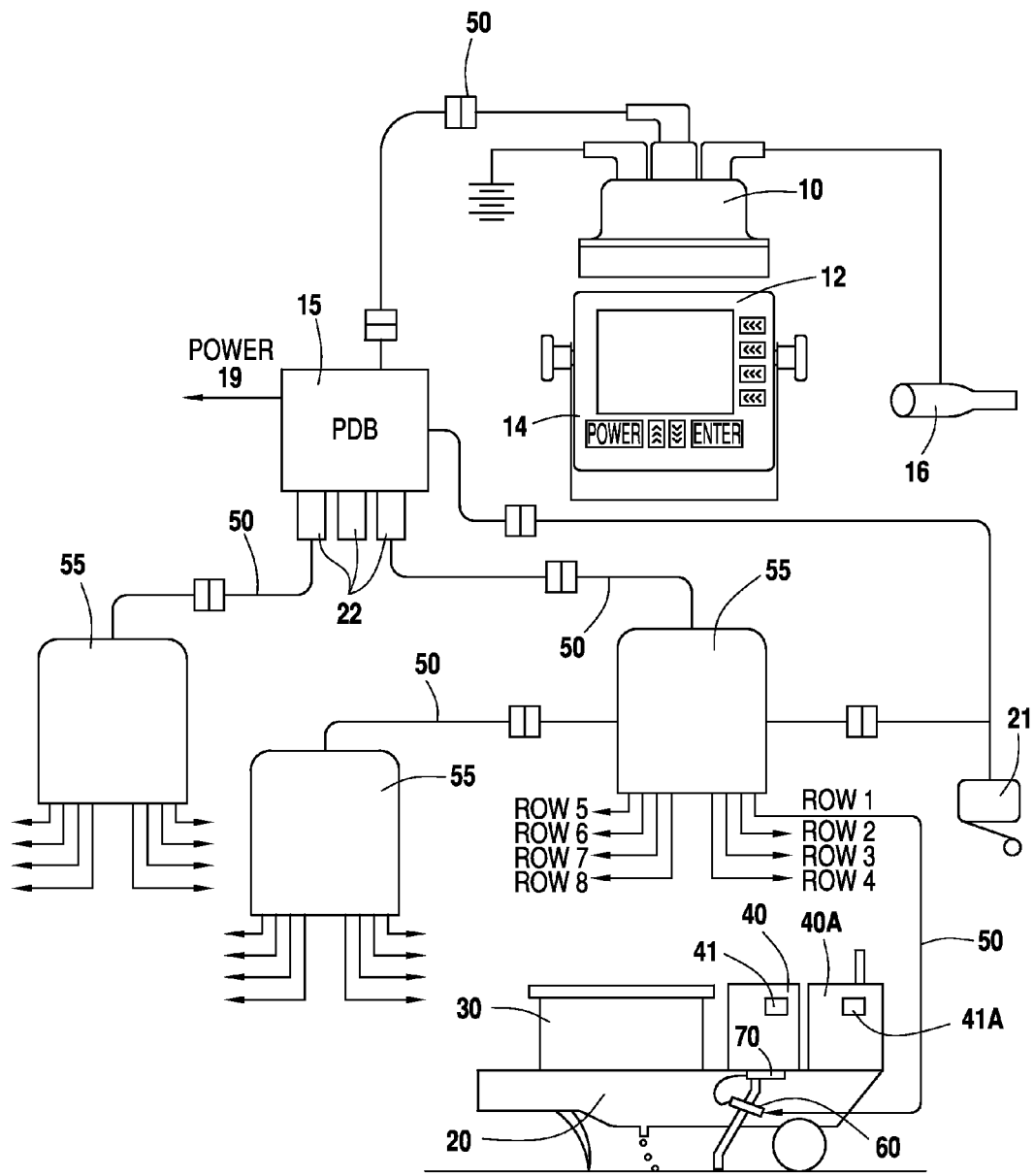
FIG. 1 is a simplified diagram showing a system for dispensing agricultural products of the present invention.

Referring now to the drawings and the characters of reference marked thereon, FIG. 1 shows a simplified diagram of a planter 20 incorporating a distributed control material dispensing system. The material dispensing system of the present invention may be used with other types of agricultural implements, but is primarily used with seed planting equipment. Although the Figures show a single row of planting equipment, typical planters include multiple rows, for example, up to 48 or more.

The distributed control system includes a main microcontroller 10, which communicates to a plurality of sub-controllers 60. (As used herein the term sub-controller may alternatively be referred to as a secondary controller, slave controller, or row controller.) The sub-controllers 60 implement commands received from the main control unit 10 by applying electric power to a metering system 70. The agricultural product container 40 may contain a memory device 85 for retaining information pertaining to the material in the container 40 and to a metering device 72 of the metering system 70 (see FIG. 2). This information is used by the main control unit (i.e. main microcontroller or master controller 10) and the sub-controllers 60 to properly dispense the product.

The material dispensing system shown in the figures is a distributed control system that employs the master microcontroller computer 10 located in the operator's cab or integrated into the onboard master display and control system of the tractor. Typically, the material dispensing system is used in conjunction with a seed planter 20 which is attached to and pulled by a farmer's tractor (not shown). Each row of the seed planter 20 includes a seed hopper and seed planting mechanism 30 and an agricultural product container (i.e. typically a product container) 40 and associated dispensing mechanism (i.e. meter system) 70. The agricultural products are dry, granular products. (Liquid dispensing processes, on the other hand, utilize dissimilar processes such as mixing in different tanks, etc.) Dry, granular agricultural products include, but are not limited to, insecticides, herbicides, fungicides, fertilizers and other agricultural products. They also may include growth hormones, growth promotion products, and other products for enhancing crop production. This master or main controller 10 distributes command and control information via a high speed serial communications link 50, via a power distribution box 15, to the sub-controllers 60 connected to individual meter systems 70. Each row corresponds to one row in the field being planted. Each individual meter system 70 is controlled by its own slave or row controller 60. The meter system 70 includes an electronic memory circuit 80 and a metering or dispensing device 72 (see FIG. 2). The meter system 70 can be permanently attached to the product container 40. The meter system 70 may be attached using a known tamper evident securing system. The row controller 60 includes a material flow sensor 62 (see FIG. 3) which is integral with the row controller 60. The material flow sensor 62 detects the presence or absence of flow from the product container 40

The main microcontroller unit 10 may include a display 12 and keypad 14 for operator interface. A speed sensing device such as radar, GPS, or wheel speed sensor 16 is connected to the main control unit 10 to provide for the tracking/monitoring of ground speed. Ground speed is used to modify the material dispensing rate to account for the planter's speed. The main control unit 10 is connected to a plurality of junction boxes 55. The junction boxes 55 are operatively positioned between a power distribution box 15 and the secondary controllers 60 by a high speed serial communications link 50. The main controller 10 is in constant communication through the serial communications link 50 to the secondary controllers 60 located on the planter 20.

The secondary controllers (i.e. row control units) 60 allow a method of multiplexing signals going to the main controller 10. A main benefit is that the main controller 10 can control a planter with only nine wires going to a junction box 55. One pair of wires is used for serial communications, three pairs of wires are provided for power to the row control units 60 and to the metering devices 72. Three pairs of wires are used for power to more evenly distribute the current requirements. The power distribution box 15 obviates the need for power to be supplied by the master controller to the secondary controllers. The power distribution box 15 is independently connected to a power source as indicated by numeral designation 19. The power distribution box 15 is also connected to a lift switch 21. The power distribution box 15 has three serial ports 22 for connection to the junction boxes 55. It includes suitable electronic overload protectors to prevent damage to the system.

The main controller 10 also contains a suitable non-volatile memory unit, such as "flash" memory, a memory card, etc. Information pertaining to the usage and application of agricultural products is stored in this non-volatile memory unit. This information is used to prepare printed reports which meet EPA reporting requirements. Currently, farmers prepare these written reports manually.

A preferred junction box 55 can connect up to eight row control units 60 to the power distribution box 15. If the planter 20 has more than eight rows, additional junction boxes 55 can be connected to the power distribution box 15. The lift switch 21 is connected to the power distribution box 15. This switch indicates when the planter 20 is not in an operating position. Other interfaces to the main control unit 10 may be provided such as serial or parallel links for transmitting information to other computer systems or printers.

The row control unit 60 has memory devices and logic devices within to modify and implement the commands from the main controller 10. The row control unit 60 can read information from a container memory circuit 80 (see FIG. 2) attached to the container 40 and may manipulate the commands from the main controller 10 to properly operate the metering device 72. For example, if the concentration or use rate of product on row 1 is different than the concentration or use rate of product on row 8, the row control unit 60 can modify the commands of the main controller 10 to properly dispense products to each row. The row control unit 60 also reads metering device 72 calibration data from the container memory circuit 80 and modifies the main controller 10 commands to account for differences in performance of different metering devices.

The row control unit 60 allows the possibility to completely change the programmed functions of the main controller 10. As an example, if a pre-programmed row control unit 60 is placed on a liquid herbicide sprayer, the main controller 10 would be able to read the dispenser type information and operate as a liquid sprayer controller.

One embodiment shown in the figures uses one row control unit 60 to control one metering device and memory unit 70. A row control unit 60 can control more than one device, for example, two metering device and memory units 70, or one metering device and memory unit 70 and one seed hopper and seed planting mechanism 30.

Each container 40 includes a metering or dispensing device 72, which allows controlled application rates under different conditions. The metering device 72 described herein is an electromechanical solenoid driven device for dry material. Other type of dispensers may be used for other materials, such as liquids. One type of metering device is described in U.S. Pat. No. 7,171,913, entitled "Self-Calibrating Meter With In-Meter Diffuser". Another type of metering device is described in U.S. Pat. No. 5,687,782, entitled "Transfer Valve For a Granular Materials Dispensing System". Another type of metering device is described in U.S. Pat. No. 5,524,794, entitled "Metering Device for Granular Materials". Another type of metering device for dry granular material is described in U.S. Pat. No. 5,156,372, entitled Metering Device for Granular Materials. U.S. Pat. Nos. 7,171,913; 5,687,782; 5,524,794; and, 5,156,372 are incorporated herein by reference in their entireties.

As will be discussed below in detail, the master controller 10 and the secondary controllers 60 are configured to provide operator defined multiple groups of rows. Each of the rows in a group has an operator assigned dispensing rate and operator assigned agricultural product. The dispensing rate and agricultural product are controllable by the operator during operation, according to planting or field needs. The master controller 10 and the secondary controllers 60 are configured to control multiple groups of rows simultaneously. A group of rows may include a single row. Thus, for example, on a 48 row planter, 48 different products can be applied, each at its own specific rate. Furthermore, each of the products and their corresponding rate can be recorded by the master controller 10 for use in record keeping.

Figure 2:
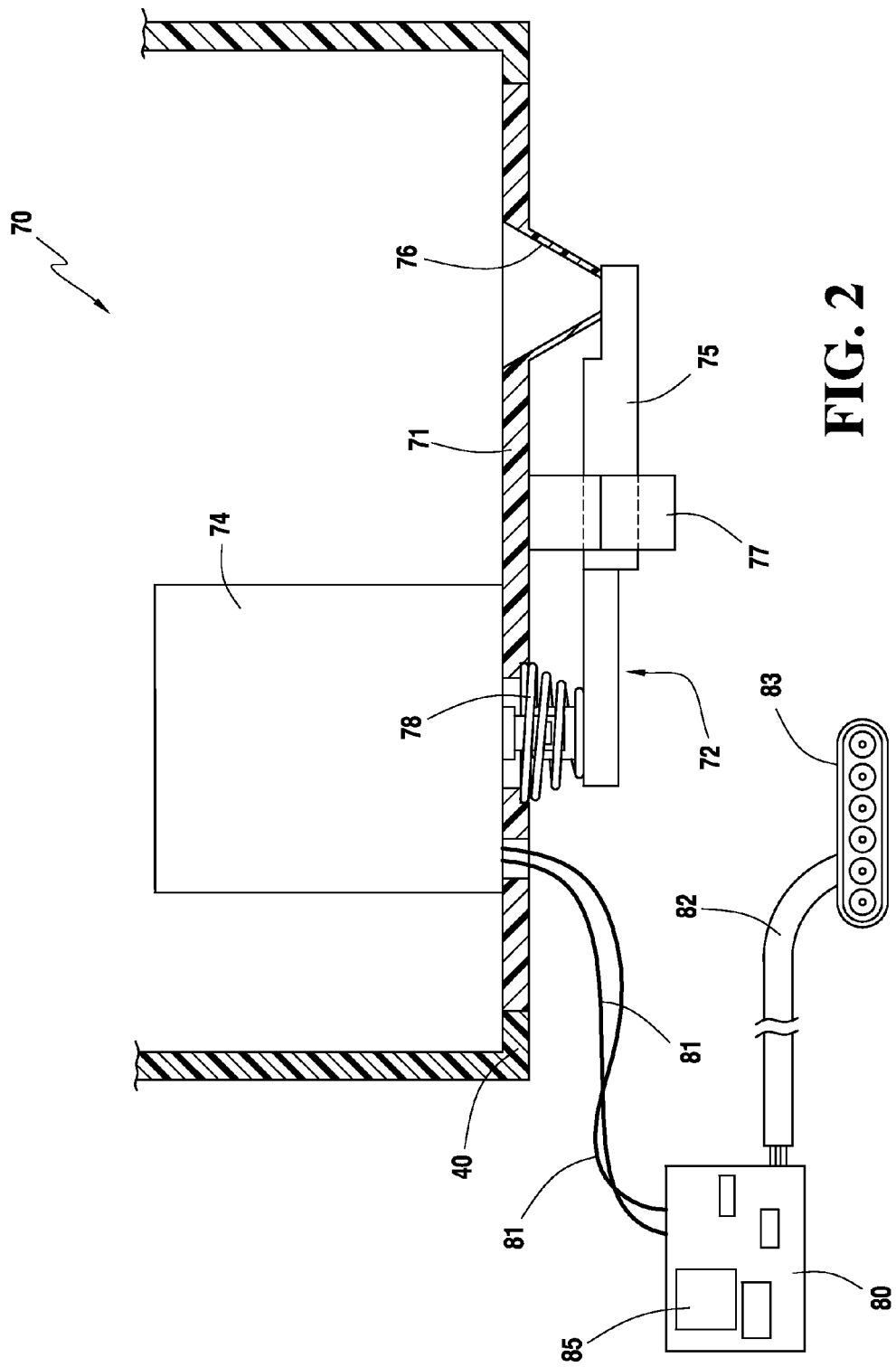
FIG. 2 is a side view of one embodiment of an electro-mechanical metering system for use with the system shown in FIG. 1.

Referring now to FIG. 2, a side view of the meter system is illustrated, designated generally as 70. The meter system 70 includes a metering device 72 and memory unit 80. A base plate 71 is fastened to the bottom of the container 40. An electromechanical metering device 72 is attached to the base plate 71. The preferred metering device 72 uses an electric solenoid 74. The solenoid 74 is attached to one end of a pivot bar 75 which pivots on pivot support 77. The other end of the pivot bar 75 is biased into contact with material dispensing aperture 76 by a spring 78. The solenoid 74 is energized by the row control unit 60 to pivot the pivot bar 75 away from the material dispensing aperture 76, thereby allowing product to flow by gravity out of the container 40.

The solenoid 74 must be sealed from the product. Product entering the solenoid 74 can cause its premature failure. The solenoid end of the pivot bar 75, the spring 78 and the connection of the pivot bar 75 to the solenoid 74 are sealed by a cover (not shown) to prevent entry of product into the solenoid 74. The preferred method for pivoting the pivot bar 75 and sealing the solenoid cover is to include a round flexible washer (not shown) in the pivot support 77. This flexible washer, sometimes referred to as a living hinge, has a small hole in the center, smaller than the diameter of the pivot bar 75. The pivot bar 75 is inserted through the small hole in the flexible washer. The flexible washer allows the pivot bar 75 to pivot and seals the solenoid cover from the product.

The electronic memory circuit (i.e. unit) 80 is connected to the solenoid 74. A multi-conductor cable 82 and connector 83 are used to connect the electronic memory circuit 80 to the row control unit 60. In one embodiment of the present invention, the row control unit 60 directly applies electrical power to the solenoid 74 through power wires 81. In addition to connecting the row control unit 60 solenoid power to the solenoid 74, the electronic memory circuit 80 also includes a non-volatile memory device 85. The memory device 85 may be an E PROM or other suitable non-volatile memory device that has an electrically erasable programmable memory. The memory device 85 is equipped to handle 48 or more rows.

The combination of the electronic memory 85 and the product container 40 with attached metering device 72 may, in combination, form a material container capable of electronically remembering and storing data important to the container, the material dispensing system, and the agricultural product. Among the data which could be stored are: a serial number unique to that container, product lot number, type of product, metering calibration, date of filling, quantity of material in the container, quantity of material dispensed including specific rates of application, and fields treated. These stored data can be recalled and updated as needed. The stored data can also be used by a metering controller or pumping system by accessing specific calibration numbers unique to the container and make needed adjustments, by sounding alarms when reaching certain volume of product in a container, or keeping track of usage of the container to allow scheduling of maintenance.

Figure 3:
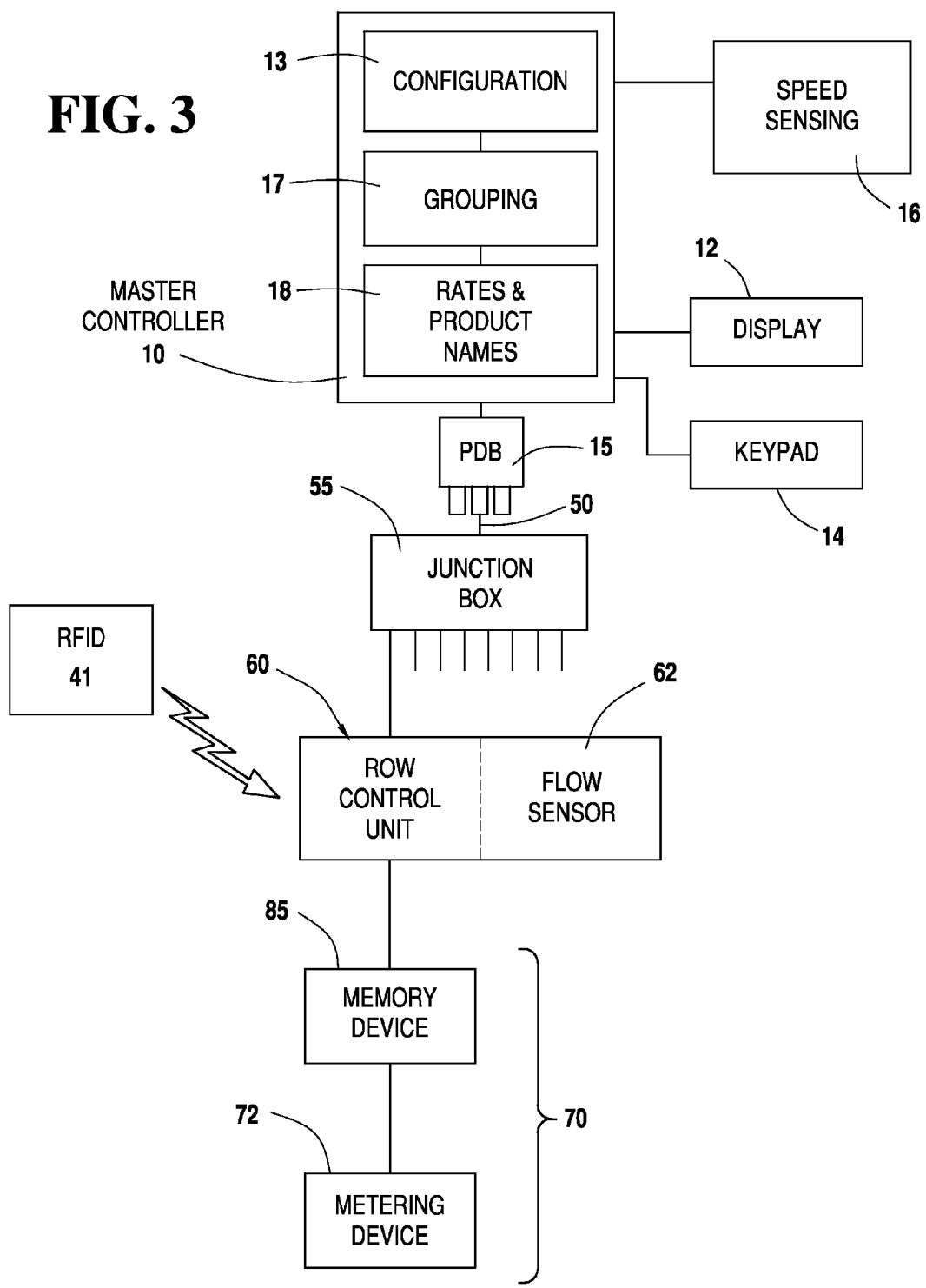
FIG. 3 is a schematic diagram of the system shown in FIG. 1.

Referring now to FIG. 3, in operation, the main control unit (i.e. master controller) 10 receives a desired dispensing rate from the operator via the display 12 and keypad 14. The main control unit 10 monitors the planter's 20 ground speed by the speed sensing device 16. Using the desired dispensing rate, the ground speed and basic dispensing characteristics for the metering device 72, command data for the row control units 60 are prepared. The preferred dispensing control for a solenoid type metering device 72 is to use a fixed rate for actuating the metering device 72, 0.5 seconds, and vary the on time (or duty cycle) of the metering device, 10% to 50%. The row control unit 60 modifies the duty cycle specified by the main control unit 10 to account the actual metering device 72 calibration data which were retrieved from the memory device 85. The row control unit 60 continues to operate the metering device 72 at the rate and duty cycle specified by the main control unit 10 until new commands are received from the main control unit 10. The main control unit 10 may calculate the quantity of material remaining in the product container 40.

As discussed above, the master controller 10 is connected to the power distribution box 15, which in turn, is connected to three junction boxes 55 via high speed serial communications links 50. The row control unit 60 has a flow sensor 62 as part of its electronic circuits. The flow sensor 62 senses the flow of material from the container 40. The main control unit 10 can monitor the flow sensors 62 and generate visual and audible alarms as required. The flow sensor 62 includes an infra-red light source positioned across from an infra-red light detector. These two components may be mounted on a printed circuit board which is part of the row control unit 60. (A hole is made in the board between the light source and the light sensor.) Alternatively, the flow sensor 62 may be a separate unit operatively connected to the row control unit 60. The dispensed product is guided between the light sensor and the light source. The logic circuit associated with the flow sensor 62 monitors for the presence of flow by intermittent interruptions of the light reaching the light sensor. Proper flow will cause intermittent interruptions of the light. A non-interrupted light will signal no material flowing from the container 40. A completely interrupted light will indicate no flow of material through the tubing after the flow sensor 62.

In some embodiments electromagnetic energy sensors can be used such as disclosed in U.S. Pat. No. 6,346,888, issued to Conrad, et al. entitled "Non-Resonant Electromagnetic Energy Sensor", incorporated herein by reference in its entirety. The '888 patent discloses a non-resonant electromagnetic energy sensor including an electromagnetic energy source and an electromagnetic energy detector in communication with the interior volume of a measuring region through which an analyte passes. The electromagnetic energy detector detects the signal variations of the electromagnetic energy within the measuring region caused by the perturbation of the electromagnetic energy field due to the passage of the analyte therethrough and responds to these signal variations by generating output signals. These output signals may then be received by electronic circuitry designed for quantitative and/or qualitative detection of the flow of various substances including individual particles, particles flowing as a continuum, and non-turbulent fluids. Thus, it detects the presence, flow-rate, and/or volume of various substances, whether the substance being measured is a solid, a liquid, or a gaseous material.

To operate the material dispensing system, it is necessary for the main control unit 10 to uniquely identify the row control unit 60, metering device and memory unit 70 pairs. Each metering device and memory unit 70 includes a unique electronic serial number in the memory device 85. Each row control unit 60 also has a unique electronic serial number. When the material dispensing system is initialized, the main control unit 10 must poll or query all the metering devices and memory units 70 and row control units 60 to determine by serial number which units 70, 60 are attached to the planter 20. This is sufficient identification for the system to function. In the preferred embodiment, the operator should be able to refer to a row and its associated seed and material dispensing equipment as row x, rather than by the serial number of the metering device and memory unit 70 or by the serial number of the row control unit 60. To associate a particular metering device and memory unit 70 and row control unit 60 to a particular row, a row configuration method is provided.

The main control unit 10 is initialized in a configuration mode with no row control units 60 connected. The row control units 60 are then connected to the main control unit 10 via the power distribution box 15 and the junction boxes 55 (one at a time) in the order in which the operator would like them to represent. The first row control unit 60 connected would represent row one. This allows an operator who prefers to work from left to right to have the left most row, row 1, and an operator who prefers to work from right to left to have the right most row as row 1.

With, for example, 48 rows on a planter 20, it is necessary to control or limit the current drawn by the metering solenoids 74. In this example, if all 48 solenoids were operated simultaneously, the electric current demands could exceed the electric capacity of the operator's tractor.

The rate at which the metering device 72 is operated is typically 0.5 seconds. The metering device 72 is actually activated at a 10% to 50% duty cycle (10% to 50% of the rate). The solenoid is turned on at 0.5 second intervals for 0.05 to 0.25 seconds. The preferred method of varying the dispensing rate is to keep the rate fixed and vary the duty cycle. Minimum electric current demand can be achieved by sequencing the activation of each metering device 72. The optimum sequence time is defined as: Rate/Number of Rows. For a 4 row system operating at a rate of 0.5 seconds, the sequence time is 0.125 seconds (0.5 seconds/4). This means that the metering devices 72 are started at 0.125 second intervals. A variation of this sequencing is to divide the metering devices 72 into sections, and stagger the starting times of each section. In other embodiments, with different solenoids the duty cycle can be increased, for example, to 90%.

The system operates in the following manner: Material dispensing begins with the main control unit 10 sending each row control unit 60 a "start" command at the appropriate time (the sequence time). The row control unit 60 does not actually receive and use the sequence time value. Because of variations in the operation of the multiple row control units 60, the row control units 60 will drift away from the ideal sequencing. It is necessary to periodically issue a "re-sync" at approximately one minute intervals and basically restart each metering device 72 which re-synchronizes each row control unit 60 back to the main control unit's 10 time base.

An alternate power sequencing method requires the main control unit 10 to send a sequence time or delay time to each row control unit 60. The main control unit 10 then sends a start command to all row control units 60 simultaneously. Each row control unit 60 then activates the associated metering device 72 after the time delay previously specified.

Referring to FIG. 3, after configuration 13 the operator is able to set product and application rate groups, as indicated by numeral designation 17. Typically, there are multiple groups of rows that are defined by the operator. The master controller and the secondary controllers are configured to control the multiple groups of rows simultaneously. However, it is within the purview of the invention that the operator defines a single group. Different groupings will be discussed below in detail. The operator can define the rates and products for each row, as indicated by numeral designation 18.

The material dispensing system features and capabilities include:

Controls application rate of material under varying operating conditions. The application rate(s) can be set by the operator from an operator's console or can be automatically read from the material container meter unit.

Provides actual ground speed information if a ground speed sensor is attached. A typical ground speed sensor includes GPS, wheel rpm and radar. In lieu of a ground speed sensor, a fixed planting speed may be entered and used to calculate the application rate of the product material(s).

The system monitors material flow and alerts the operator to no flow, empty container, or blocked flow conditions.

The system may monitor and track container material level(s) for each row.

The system provides control information and data to a non-volatile memory for future downloading.

The system monitors the planter to allow product to be applied only when the planter is in the planting position.

A typical usage for this system is:

1) In some embodiments, for a new product container, the metering device and memory unit 70 may be attached to the product container 40 by either the container manufacturer or at the container filling site. In other embodiments, the metering device and memory unit 70 may be attached to the product container 40 by the grower.

2) A computer is connected to the metering device and memory unit 70. (In some embodiments this might be at the time of filling.) The following information may be electronically stored in memory device 85:

Date

EPA chemical ID numbers

Container serial number

Suggested doses, such as ounces per linear row foot for root worm, or ounces per acre for grubs, etc. These rates are specified by the manufacturer.

Meter calibration information, depending on type of metering device

Tare weight of the container

Weight of the full container

3) The product container is sealed and prepared for shipping

4) The user takes the product container 40 and attaches to dispensing implement, such as planter, sprayer, nurse tank, etc. The main controller 10 receives the information from the metering device and memory unit 70 pertaining to proper application rates and prompts the user to pick the desired rate(s). The row control unit 60 reads the metering device(s) calibration information from the metering device(s) and memory unit(s) 70. This information is used in combination with commands from the main controller 10 to properly control the operation of the metering device(s) 72. The user may enter a field ID number and any other required information such as number of rows, width between rows, etc. The user applies the product(s) to the field. The main controller 10 monitors the ground speed and changes the amount(s) being dispensed to keep a constant rate(s) per acre. When the user completes the application to a field, additional fields may be treated. Field data, including field ID number, crop treated and quantity(ies) applied are recorded in the main controller's 10 non-volatile memory. This information may also be recorded in the metering device(s) and memory unit 70 for later use by the user, the agrochemical distributor or product supplier.

Figure 4:
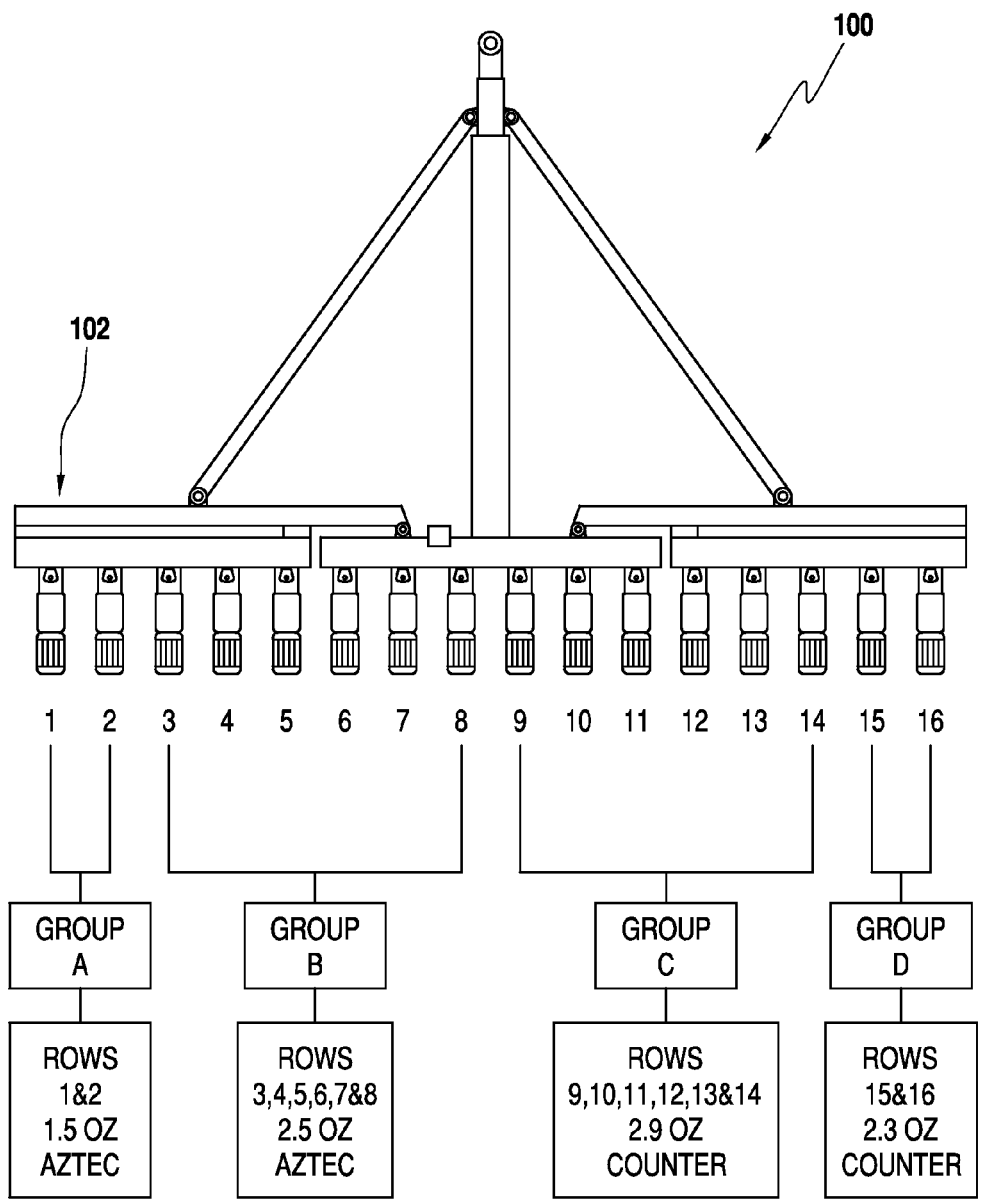
FIG. 4 is a diagrammatic illustration of a planter in accordance with the principles of the present invention showing a row grouping.

Referring now to FIG. 4, an example of row grouping on a corn planter is illustrated, designated generally as 100. In this example, there are four groups—Group A, Group B, Group C, and Group D—designated for a sixteen row planter 102. The grouping feature allows the growers (operators) to apply the correct product at different rates for designated rows in one planting operation. This example indicates that Group A includes rows 1-2 with Aztec® pesticide at a rate of 1.5 ounce per 1000 feet of row. Group B includes rows 3-8 with Aztec® pesticide at a rate of 2.5 ounce per 1000 feet of row. Group C includes rows 9-14 with Counter® pesticide at a rate of 2.9 ounce per 1000 feet of row. Group D includes rows 15-16 with Counter® pesticide at a rate of 2.3 ounce per 1000 feet of row.

This feature allows the grower to use different or the same product at different rates due to different seed traits on designated rows. For example, this feature allows use of a lower rate(s) of product on triple stacked or quad stacked corn seed (root worm traits) on most rows on the planter but on designated rows the grower may be planting refuge corn seed (non-root worm trait or non GMO corn). This allows the use of higher rates of product for the non-traited corn.

In certain embodiments the product release on the seed within a row can be identified with color or another tracking mechanism such as detection by size differential. This can provide differential application of product. For example, different colored seed rates or products can be switched by making the seed sensor color sensitive. Other seed characteristics can provide this differentiation such as infrared detection (by heating the seed), magnetic detection, etc.

The grouping feature discussed above allows the grower to use different products at different rates so he/she can do comparative evaluations to see which product and rate works best for their farming and production practices.

The grouping feature allows the growers to use different products and rates as required by a third party. For example, this feature can be used in seed corn production where the male rows typically receive a partial rate of insecticide.

The grouping feature allows seed corn companies to run different trials of products and rates on new seed stock production trials to determine what rates and products are best for their particular seed. For example, certain parent seed stock may respond (positive or negative) to certain crop protection products and rates of the products. This grouping feature allows the research to be accomplished in a timely fashion.

Setting row groups allows the grower to shut off certain rows while maintaining flow as needed from the rest of the row units. This saves product(s) and money where the product(s) is/are not needed.

Figure 5:
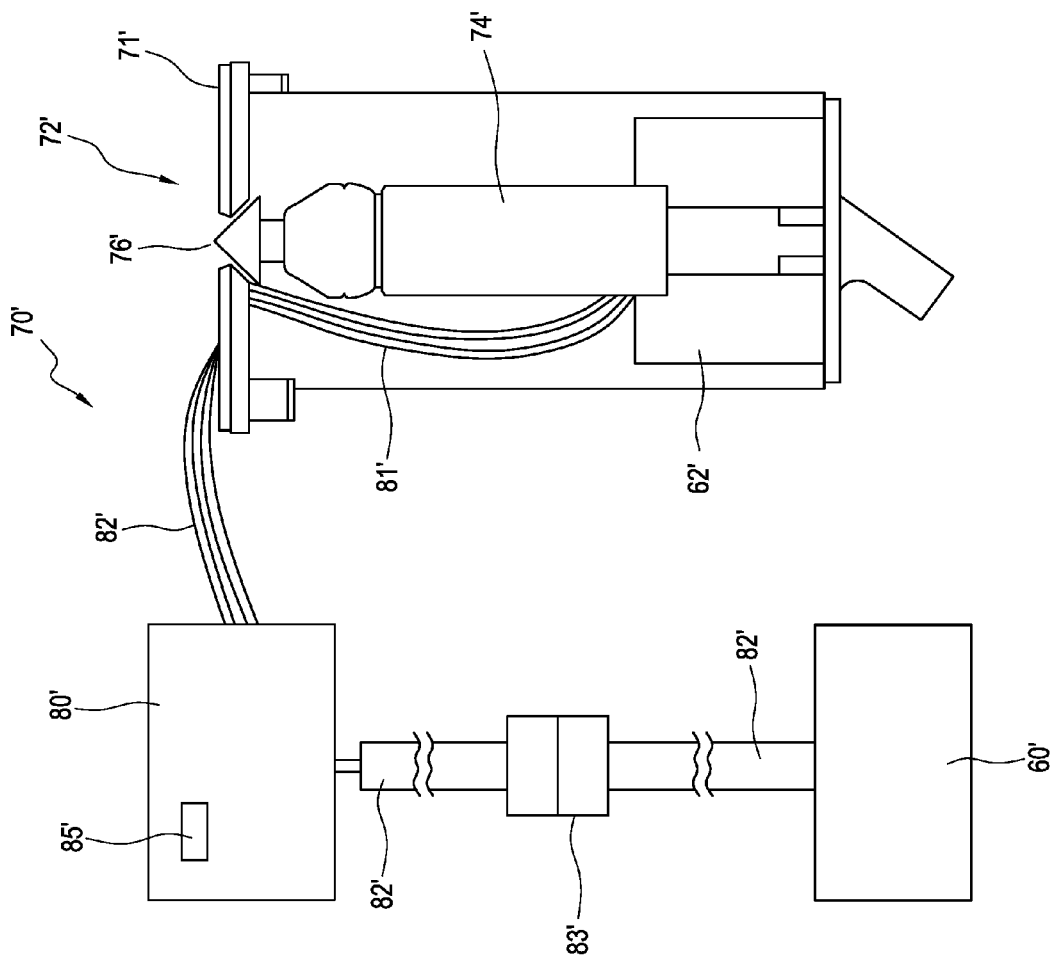
FIG. 5 is a schematic illustration of an alternative embodiment of a metering system.

Other embodiments and configurations may be devised without departing from the spirit of the invention and the scope of the appended claims. For example, referring now to FIG. 5, a side view of an alternative meter system is illustrated, designated generally as 70'. In this system 70' the pivot bar is omitted and the metering device 72' is external from the container 40. This is done to eliminate one moving part (i.e. the pivot bar) if there is sufficient space. The meter system 70' includes a metering device 72' and memory unit 80'. A base plate 71' is fastened to the bottom of the product container 40 (not shown). The electromechanical metering device 72' is attached to the base plate 71'. The preferred metering device 72' uses an electric solenoid 74'. The solenoid 74' is energized by the row control unit 60' to retract the solenoid plunger away from the material dispensing aperture 76', thereby allowing product to flow by gravity out of the container 40.

The solenoid 74' must be sealed from the product. Product entering the solenoid 74' can cause its premature failure. The solenoid 74' is sealed by a cover to prevent entry of product into the solenoid 74'.

The electronic memory circuit (i.e. unit) 80' is connected to the solenoid 74'. A multi-conductor cable 82' and connector 83' are used to connect the electronic memory circuit 80' to the row control unit 60'. In one embodiment of the present invention, the row control unit 60' directly applies electrical power to the solenoid 74' through power wires 81'. In addition to connecting the row control unit 60' solenoid power to the solenoid 74', the electronic memory circuit 80' also includes a non-volatile memory device 85'. The memory device 85' may be an E PROM or any other suitable non-volatile memory device that has an electrically erasable programmable memory.

Referring again to FIG. 1, the present system for dispensing agricultural products may include a plurality of sets of agricultural product containers, the second in the set shown in FIG. 1 being designated by numeral designation 40A. Each of the sets (40,40A) of agricultural product containers is associated with a respective row in the field. Agricultural product from each agricultural product container 40,40A is dispensed in accordance with operator-defined instructions to the master controller. The instructions are capable of being provided to the master controller during planting allowing the dispensing of individual product containers to be controlled. Command data may be of various types and from various input sources including, for example, field condition mapping using satellite telemetry combined with GPS location; previous year yield data input; soil analysis; soil moisture distribution maps; and, topographical maps.

An identification device 41 may be positioned in association with a product container for providing identification information to the master controller 10 (see also FIG. 3). The identification device 41 is generally affixed to the container 40. The identification device 41 is preferably a radio-frequency identification (RFID) chip for providing identification information to the master controller 10. The master controller 10 assigns the product container 40 and its operatively connected meter device 70 to a specific row. Identification information typically includes product name, rate, net weight of the product, etc. Preferably, if the product identification is not for an authorized product then the operatively connected meter device 70 will not operate. Each product container 40, 40A generally includes its own RFID chip 41, 41A. (Note that in FIG. 2, a memory storage device 85 is shown as part of the metering system 70. However, when an RFID chip 41, 41A is used, it is not physically attached to the metering system 70.)

Figure 6:
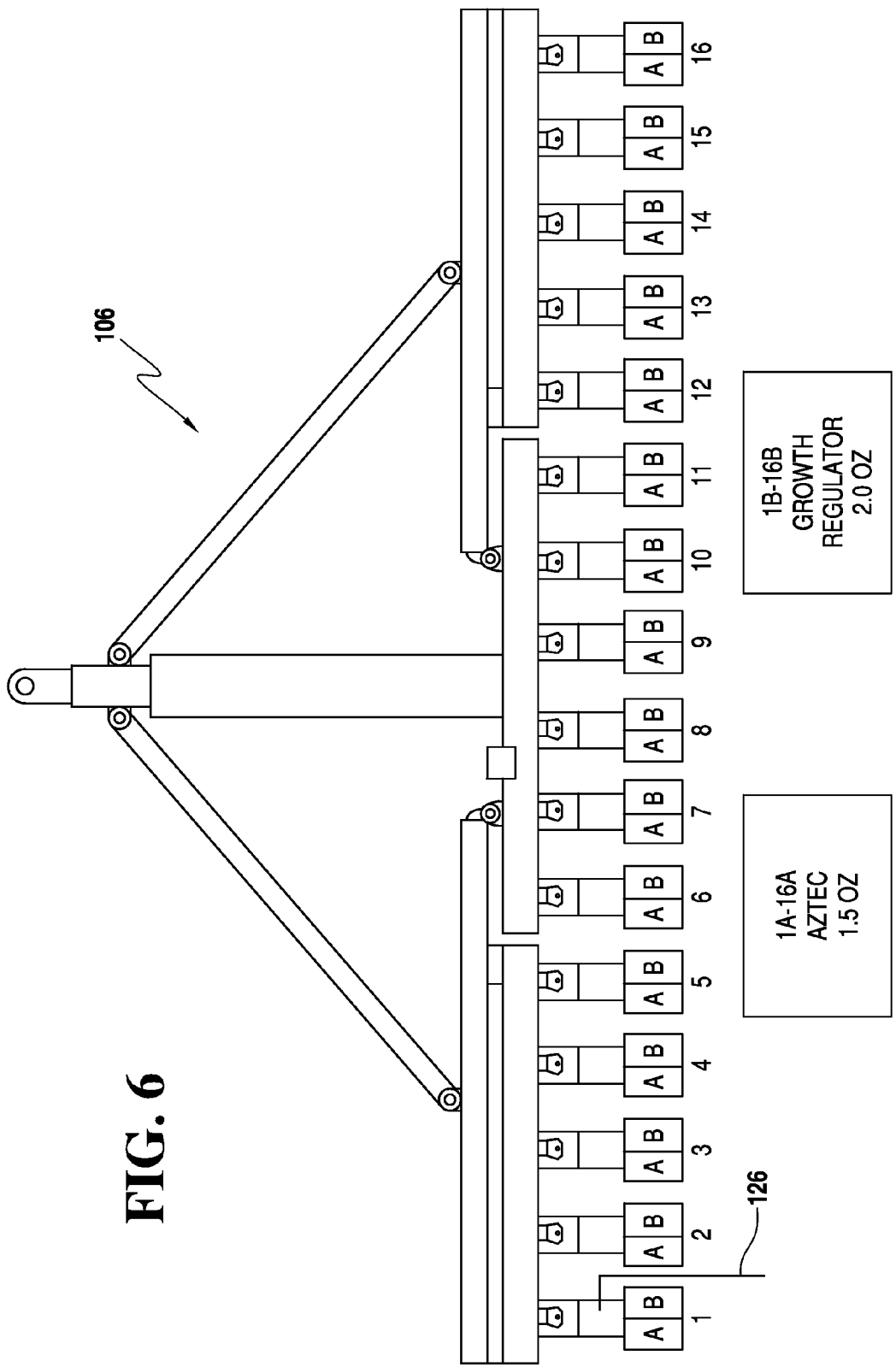
FIG. 6 is a diagrammatic illustration of a planter in accordance with the principles of the present invention showing utilization of sets of agricultural product containers, shown side by side, mounted on a 16-row corn planter.

Referring now to FIG. 6, a planter 106 in accordance with the principles of the present invention is illustrated, showing utilization of 16 sets A, B of agricultural product containers, shown side by side. This figure shows the container sets A, B mounted on the rear of the 16 row corn planter 106. Aztec® pesticide (containers 1A-16A) is for controlling insects. Growth regulator (containers 1B-16B) is for enhancing plant growth. Thus, there are multiple meters per row, each meter being operatively connected to a product container of a set of product containers.

Applying the product directly into the furrow with the seed can eliminate the insecticide dust but still protect the seed. Also, some seed treatments may shorten seed life thereby making it impractical to save seed for the next year. Also, treating at planting time gives the farmer flexibility to use different seed treatments besides the seed treatment that the seed company has applied. Another use is relative to soil inoculants. Soybeans are inoculated and re-bagged but a high percentage of the inoculating organisms are dead by planting time. Applying the inoculants or other biologicals to the soil at planting time may greatly reduce the amount of product used because they can be stored under better conditions. In the future, farmers may have many other choices of products that may be applied at planting and may want to apply more than one product with the planter.

Also, split-planter mapping has shown that when two different soil insecticides are applied at planting time one insecticide may provide a different yield response from the other insecticide. This is because different insecticides work against different insect species. The population of insects may vary according to soil types and conditions. Corn nematodes are more likely to be in sandy soils and soybean nematodes can vary according to the PH of the soil. Other soil insect pest populations vary according to the amount and type of organic material and soil moisture in the field. If a planter is equipped with different insecticides, they can be applied, by using GPS, to the area where they are needed. Planters already have the capability to change hybrids of corn as soil types and characteristics change.

Thus, the planter can be equipped with several different products and applied as need. Also, the products can be applied several different ways as needed. Product containers can be mounted in several locations on the planter as needed for application. There are several different placement options available for placing the product into or onto the soil. For example, the present invention may include in-furrow placement and/or banding above the furrow. As discussed, the system can run, for example 48 row units, with different products or rates in each row. Products can be applied together or applied in different areas. For example, one product can be applied in-furrow and another placed in a band. Also, sometimes multiple products such as seed treatments for disease and inoculants are applied to seeds at the same time but there is limited time for planting because they affect each other and will not be active unless planted within a specific time. Applying products at planting gives the farmer more flexibility.

Figure 7:
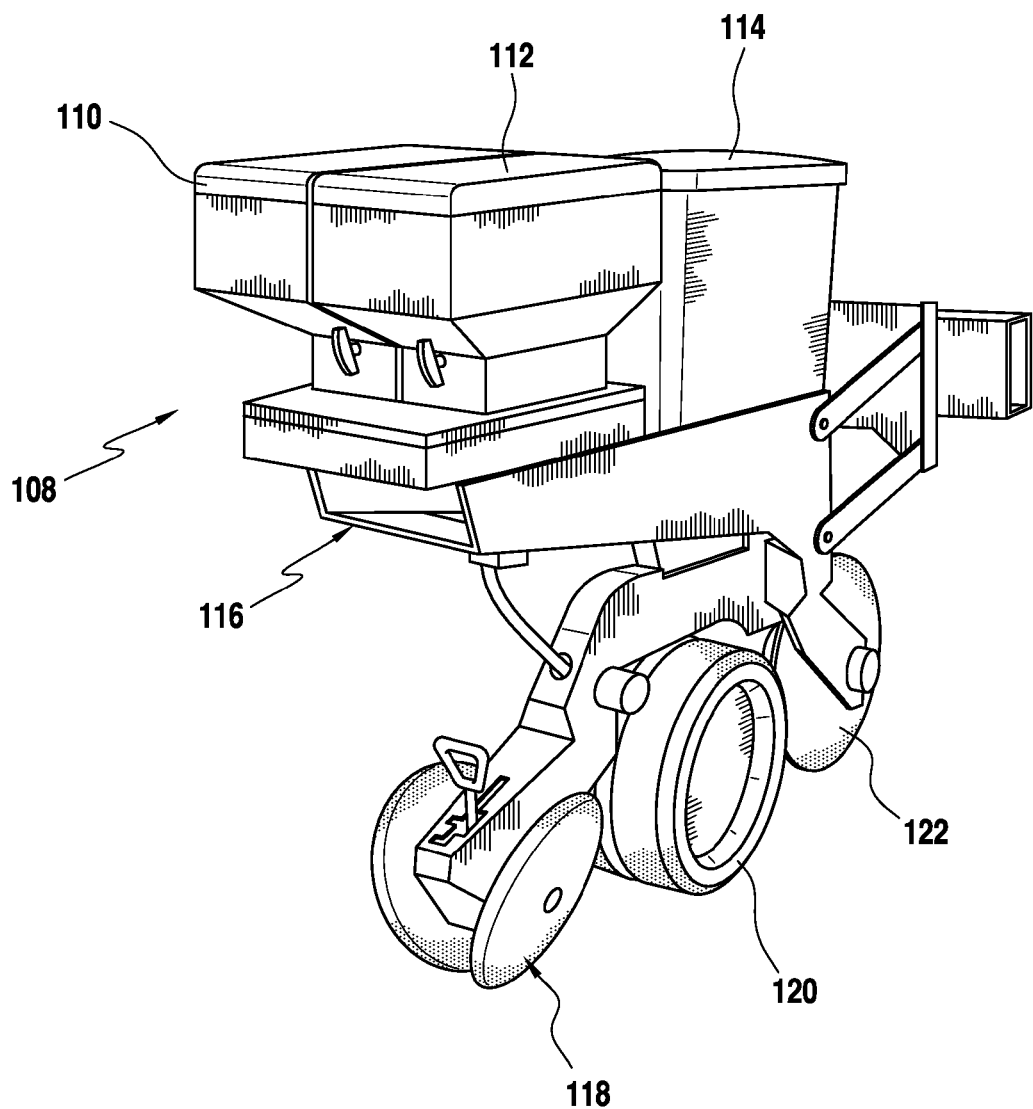
FIG. 7 is a perspective illustration of a planter row unit with side-by-side containers, in a rear mounted position, in accordance with the principles of the present invention.

FIG. 7, is a perspective illustration of a planter row unit 108 with side-by-side product containers 110, 112, in a rear mounted position. A seed meter assembly 114 is positioned in front of the containers 110, 112. The containers 110, 112 are mounted on a base unit, designated generally as 116. The planter row unit 108 also includes a closing wheel assembly 118, depth wheel assembly 120, and row coulter 122.

Figure 8:
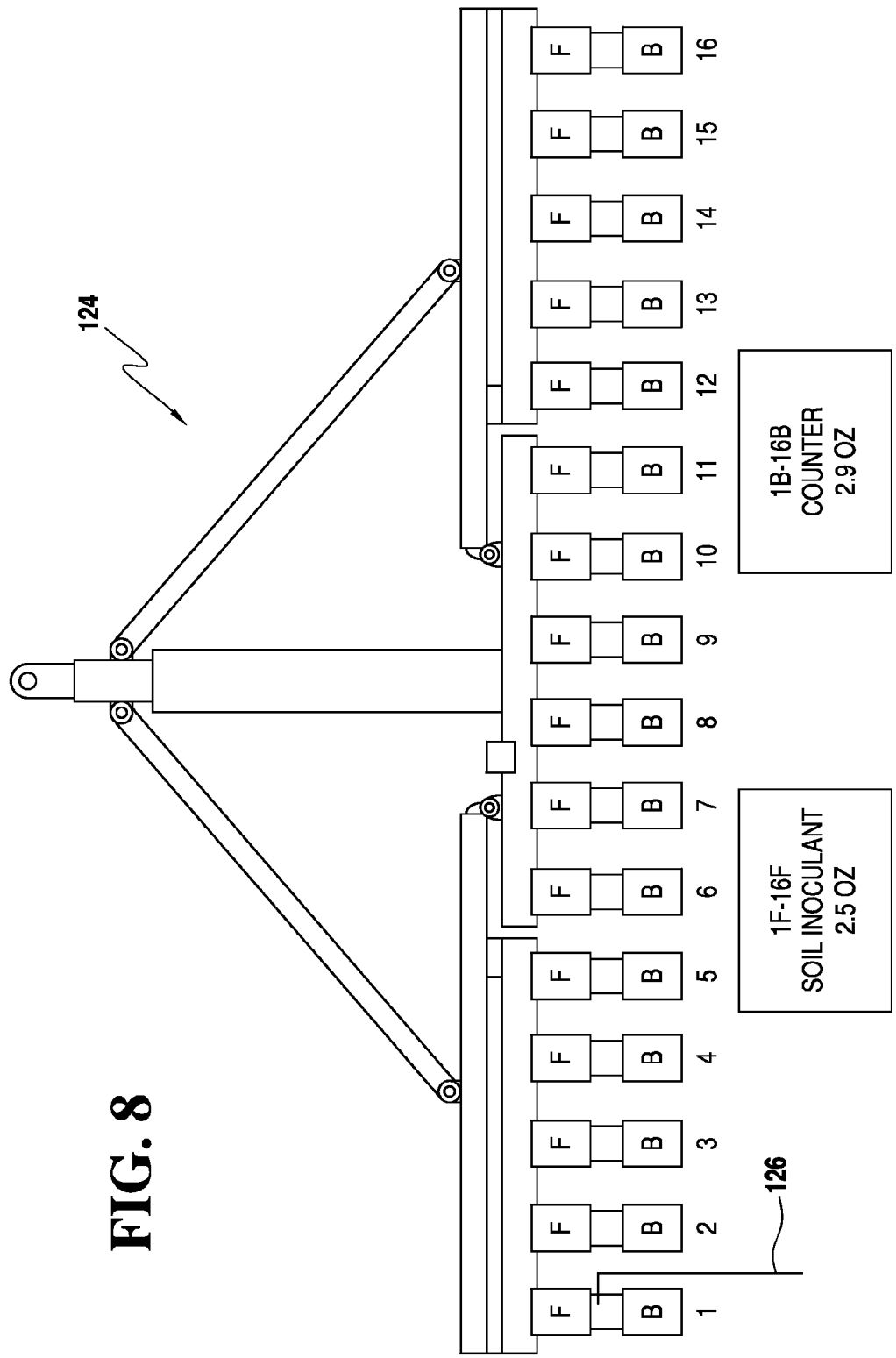
FIG. 8 is a diagrammatic illustration of a planter in accordance with the principles of the present invention showing utilization of sets of agricultural product containers, each set including one container mounted in front of a seed meter assembly and one container mounted behind the seed meter assembly.

Referring now to FIG. 8, a planter 124 in accordance with the principles of the present invention is illustrated showing utilization of 16 sets F, B of agricultural product containers, each set F, B including one product container F mounted in front of a seed meter assembly 126 and one product container B mounted behind the seed meter assembly 126.

Although FIGS. 6-8 only show two containers in a set of containers, a set may include numerous product containers. Higher crop prices also make multiple treatments more economical. The present invention provides application of multiple products to the same row at planting time. As future agricultural science grows more products will become available. The present invention has the capability to apply them at planting according to soil type, insect pressure, soil fertility, and plant requirements.

In addition to addressing power sequencing improvements to minimize the peak power requirement as noted above, additional embodiments of the present invention may include an in-meter diffuser that receives foreign material and lumps in order to prevent the metering apparatus from becoming clogged. In certain embodiments a pulsing electrical valve and/or a gate or door is utilized which opens or closes in order to permit the flow of chemical products. U.S. Pat. No. 7,171,913, incorporated by reference herein, discloses a diffuser and pulsing electrical valve.

In certain embodiments, the effectiveness of soil-applied chemicals can be increased at planting time by inducing seed and chemical granules into the same seed dispensing tube, delivering the chemical products and a seed in close proximity with each other in such a way that the chemical products are dispersed with the seed as the seed passes through the seed dispensing tube. For example, U.S. Pat. No. 6,938,564, entitled "Method and System for Concentrating Chemical Granules Around a Planted Seed," issued to Conrad, et al., discloses a system in which chemical granules are dispensed through a granule tube into a seed dispensing tube, where the granule tube is connected to the seed dispensing tube at a location above a lower opening of the seed dispensing tube, and where the lower opening of the seed dispensing tube is covered with a brush. A seed is dispensed through the seed dispensing tube. The brush holds chemical granules within the seed dispensing tube such that chemical granules accumulate within the seed dispensing tube, and the brush allows a seed and accumulated chemical granules to pass through the lower opening when the seed is dispensed via the seed dispensing tube.

Thus, precision placement of chemical around the seed can optimize chemical utilization. In certain embodiments the agricultural product may be dry and in others it may be liquid.

Figure 9:
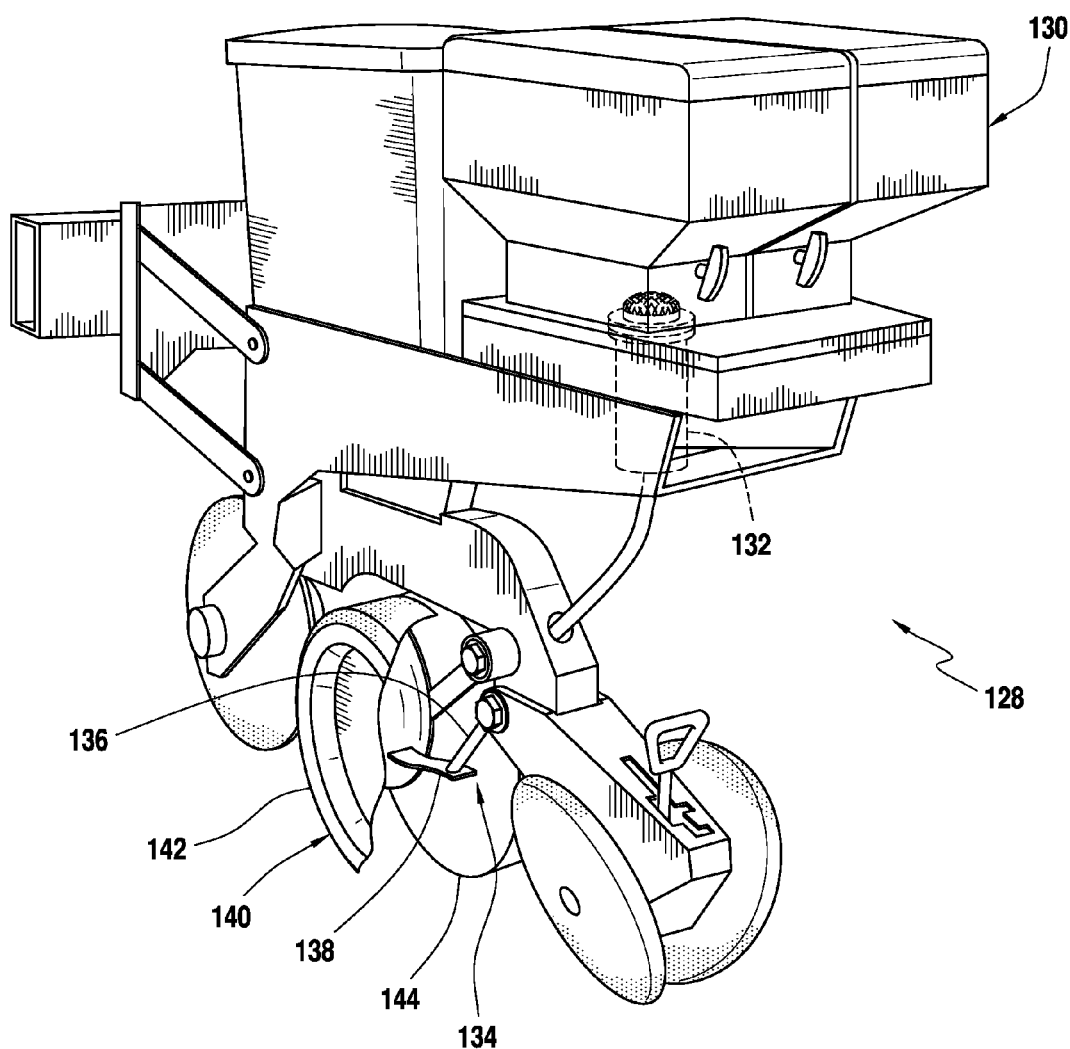
FIG. 9 is a low application rate dispensing planter row unit specifically designed for dispensing agricultural products at a low application rate, a depth control wheel being shown partially cutaway to expose a rear mounted placement tube.

Referring now to FIG. 9, a perspective illustration of an embodiment of a low application rate dispensing planter row unit is illustrated, designated generally as 128, which dispenses agricultural products at a low application rate. The low rate dispensing planter row unit 128 includes rigid product containers 130 containing low application rate agricultural products. The rigid product containers being utilized are designed to maintain product integrity during shipping and storage. A preferred rigid container is formed of high-density polyethylene (HDPE). The density of high-density polyethylene can range from about 0.93 to 0.97 grams/centimeter$^3$. An example of a suitable rigid container is high density polyethylene formed of Mobil™ HYA-21 HDPE or equivalent material. It preferably has a wall thickness of between about 0.17 to 0.28 inches.

In the past, pallets of bagged product were stacked four or five high for months in the warehouse. A common procedure was to drop the bag on the ground or floor to break them up if they seemed rigid. Standard application equipment has rotors to help grind up lumps. But this is only moderately effective at rates commonly in use today because the control orifices in the bottom of present meters are large enough to pass some lumps. Lumps still get caught in the orifices until the rotors forced them through. At lower rates the control orifice has to be small enough to control the flow however this orifice size is too small for free flow so the product has to be forced through the control orifice by the rotor movement. Any lumps make the plugging issues worse. Also, a major problem with paper bags is that cutting them, tearing them open, or other opening techniques causes small pieces of paper to enter the application system which can cause more plugging issues. Also, filling the planter equipment from non-closed systems with open lids allows foreign material such as dirt, corn residue, to enter the system, causing plugging. This is especially problematic on windy days.

The utilization of rigid product containers obviates the problems mentioned above.

Low application rate meter devices 132 operatively connected to the rigid product containers 130 are configured to dispense the agricultural products from the plurality of rigid product containers 130. As used herein, the term "low application rate" is defined as a rate below 3 ounces per 1000 feet of row.

When the weight of the inert ingredients (i.e. carrier) is lowered while the weight of the active ingredients is maintained approximately constant, then the consistency is maintained within control parameters and pest damage is also maintained within acceptable parameters.

Granules used as carriers may include, for example, the following:

Amorphous silica-bulk density in a range from about 0.160 to 0.335 g/mL,

Biodac® carrier—bulk density in a range from about 0.64 to 0.79 g/mL,

Clay—bulk density in a range from about 0.40 to 1.12 g/mL,

Sand—bulk density in a range from about 1.6 to 2.1 g/mL.

Granules loaded with chemicals will typically have a bulk density greater than the above values by about 10 to 30%.

The granules used as carriers may have sizes, for example, with diameters of from about 50 microns (fine sand, silica) to 4000 microns (coarse sand). Clay granules are typically around 500 microns, Biodac® granules are typically around 2500 microns.

A typical clay granule weighs from about 0.07 to 0.09 mg. A typical Biodac® granule weighs around 0.2 mg. A silica granule weighs from around 0.02 mg to 0.05 mg. A sand granule can weigh up to about 5 mg (coarse).

One example of a granule used as a carrier has a bulk density of 0.866 g/mL, an average granule size of 510 microns and an average granule weight of 0.082 mg.

The agricultural products may be insecticides or a wide variety of other crop enhancement agricultural products such as fungicides, plant growth regulators (PGRs), micro-nutrients, etc.

Most current meter designs have a moving rotor in them that acts as a shut off device and is constantly spinning the product inside the insecticide hopper. As the application rate is reduced the amount of granules that are ground up and therefore the application rate is affected. If a low application rate is used the meter orifice may be smaller than the free flow rate for the granules and will result in more grinding and an uneven product flow. Also, at turnoff, the meter paddle forms a pool of product around the orifice that flows out as the planter turns around at end rows. John Deere & Company and Kinze Manufacturing have made modifications to reduce this effect at rates in use today but these modifications would not be effective at the low application rate indicated here.

In one embodiment, the low application rate meter devices 132 have larger orifices than previous conventional meter devices so they can free flow at lower rates. Preferably, the orifice diameter is in a range of 0.20 inch to 0.50 inch. An example of such a low application rate meter device is embodied in the SmartBox Dispensing System which has an orifice diameter of 0.25 inch to 0.50 inch depending on the rate of the product used. (The orifice is referred to above with respect to FIGS. 2 and 5 as an aperture.) The orifice diameter must be large enough to deliver more than the free flow of the intended product. The pulsing of the meter is one way to regulate the application rate of the product.

The low rate dispensing planter row unit 128 includes precision placement equipment operatively connected to the low rate meter devices to place the low usage rate agricultural products in the desired locations for efficient activity of the agricultural products. As shown in FIG. 9, such precision placement equipment may include, for example, a placement tube assembly 134. Thus, the low rate meter devices and the precision placement equipment dispense the agricultural products at an optimized efficiency.

In the embodiment illustrated in FIG. 9, the placement tube assembly 134 includes an elongated placement tube 136 connected to a foot 138. The foot 138 keeps the elongated placement tube 136 lined up with the depth control wheel assembly (also referred to above as a "depth wheel assembly") 140. Each placement tube assembly 134 is preferably fabricated from stainless steel. Use of stainless steel prevents corrosion from effecting placement or plugging. The placement tube assembly 134 shown in FIG. 9 is adapted to be utilized with a John Deere planter, as shown in this figure. It is rear mounted. Thus, each placement tube assembly 134 is mounted for placement of product in-furrow between each depth wheel 142, 144 of the depth control wheel assembly 140 of the planter.

As can be seen in FIG. 10, the placement tube assembly 134 also includes an attachment bracket 146. As can be seen in FIGS. 11 and 12, the attachment bracket 146 is used to connect the placement tube assembly 134 firmly to the frame 148 of the planter. Also shown in FIG. 11 is a depth wheel disc 150 that is attached to the frame 148 by an arm 152 that controls the depth wheel 144. As can be seen by reference to FIG. 12, the placement tool assembly 134 can be installed by removing the bolt 153 that fastens the closing wheel hinge assembly 155 by reinserting the bolt through the placement tube assembly and tightening the bolt. The top of the elongated placement tube 136 is placed through the existing in-furrow. Using the removed bolt 153, the elongated placement tube 136 is replaced and tightened. In use of the SmartBox system it is preferred that a minimum 45 degree angle be maintained at any point along the product discharge path from the meter outlet to the in-furrow elongated placement tube. The elongated placement tube may need to be bent to adjust it accordingly. The plastic hose from the SmartBox system should be cut to length to eliminate any unnecessary slack that could cause a flow restriction. Also, if using a seed firmer the foot 138 may need to be cut off or bent up if restricting the firmer's amount of travel.

Figure 13:
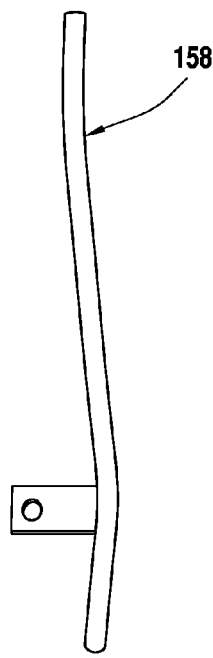
FIG. 13 is a perspective illustration of a front mounted placement tube assembly.
Figure 14:
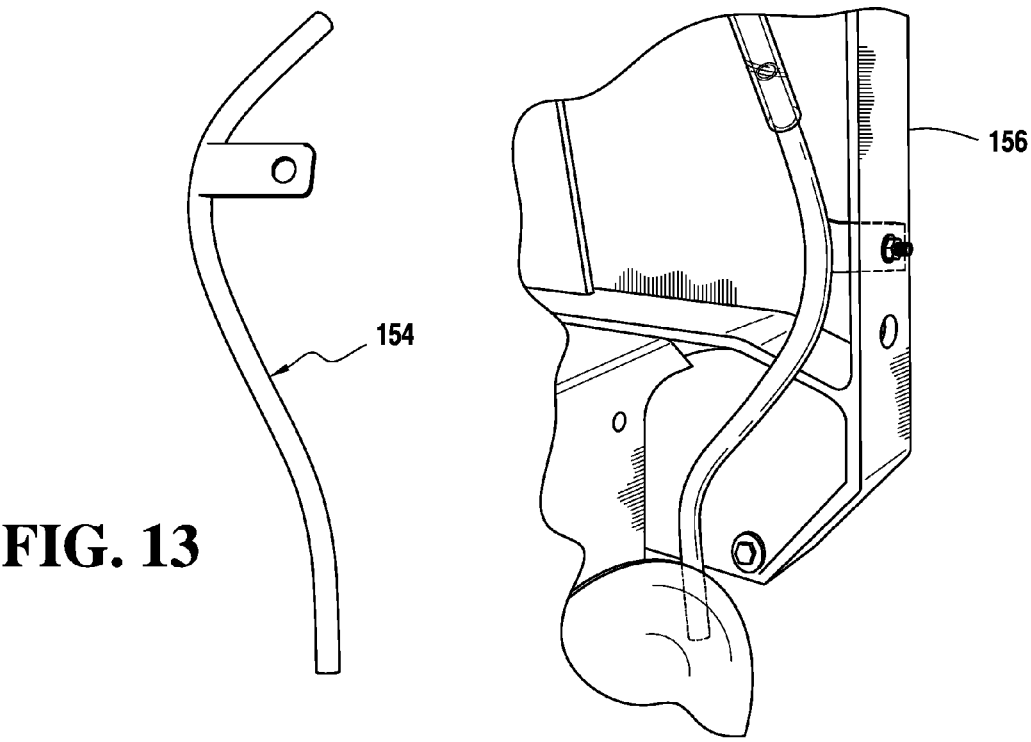
FIG. 14 illustrates the manner in which the front mounted placement tube assembly of FIG. 13 is mounted to the frame of a dispensing planter row unit.

Referring now to FIGS. 13-14, a front mounted placement tube assembly 154 is shown. This tube assembly is also preferably stainless steel. This front mounted placement tube assembly 154 is also adapted to be utilized with a John Deere planter. It is attached to a front portion 156 of the row unit frame of the planter.

This type of placement tube assembly may be used for SmartBox system front mount applications on John Deere planters equipped with three bushel seed boxes and on AGCO White 8000 series planters equipped with three bushel seed boxes. It may be used on 2004 and earlier John Deere MaxEmerge®, MaxEmerge® 2, and MaxEmerge® Plus planters that have a fabricated shank. (2005 and newer John Deere "XP" models that have a ductile cast iron shank can use a front side mount placement tube assembly.) The tube is welded into a hole that needs to be drilled into each planter row's opener guard (i.e. dirt shield, rock guard). The tube has an offset bend to allow for mounting on planters equipped with row cleaners. Additional bending may be required for proper fit up. (All sections of the tube should be at a minimum of 45° angle for proper product flow.) If row cleaners are not used, the tube's short bend is not necessary and can be cut off prior to installation and welding if desired. For installation, the opener guard is removed. A ⅝ inch diameter hole is drilled approximately 1 inch down from the top and in the center of the opener guard. The tube is inserted and aligned so it protrudes approximately 1 inch inside of the opener guard and welded into place. The opener guard is reattached. (Note: If the tube rubs on the inside of the opening disks, it may be necessary to slightly flatten this section of the tube. A minimum tube opening of 3/16 inch should be maintained.) The placement tube assembly is installed as discussed above with respect to the previous embodiment.

Figure 15:
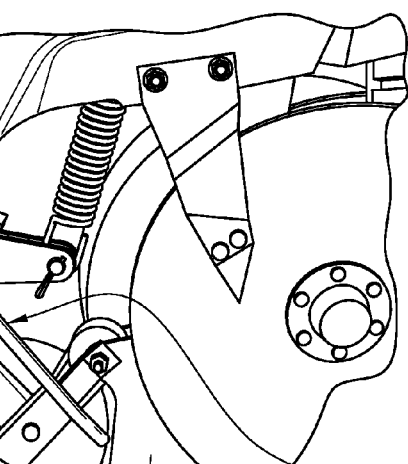
FIG. 15 is a perspective illustration of another embodiment of a rear mounted placement tube assembly.
Figure 16:
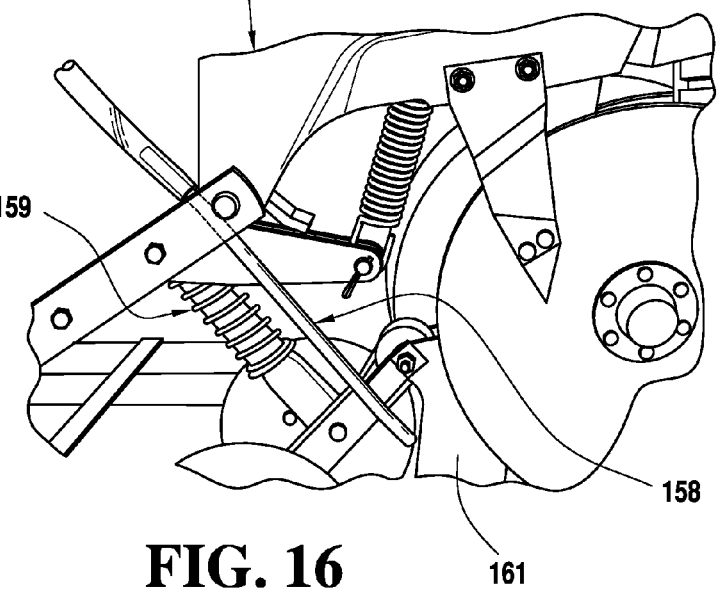
FIG. 16 illustrates the manner in which the rear mounted placement tube assembly of FIG. 15 is mounted to the frame of a dispensing planter row unit.

Referring now to FIGS. 15-16, another example of a rear mounted placement tube assembly is illustrated, designated generally as 158. This slightly curved rear mounted placement tube assembly 158 is particularly adapted for use with a Case IH™ planter 160. This type of placement tube assembly may be used for all SmartBox system rear mount applications on Case IH planters. It generally requires some bending to fit correctly into the tight space that it occupies. A suitable row is selected having proper access for installation of a tube. Any necessary adjustments should be made prior to mounting on each individual row. For installation the nut on the closing disks hinge is removed. The top end of the tube is threaded upward through the gap by the press wheel hinge. The bottom end of the tube is inserted into the seed shoe, while placing the tubes mounting bracket tab over the hinge bolt. (Longer hinge bolts may be required). It should be assured that the bottom end of the tube is inside the seed shoe's skirt to prevent plugging. The nut is placed back on the bolt, and tightened to provide a final adjustment. The nut is removed and this process is repeated for all tubes, before re-mounting them on their respective rows. The placement tube assembly is installed as discussed above with respect to the previous embodiments.

Rear mounted placement tube assembly 158 provides enhanced placement into the furrow. The Case IH closing wheel spring assembly tube 159 is intended to be used to provide for in-furrow application of product, however the tube 159 is behind the leading edge of the closing wheels so the furrow tended to be closed up before the product can be dispensed into the furrow. Rear mounted placement tube assembly 158 is positioned to apply product into the back of the seed shoe 161 before the furrow can close.

Referring now to FIGS. 17-18, another example of a rear mounted placement tube assembly is illustrated, designated generally as 162. This substantially straight rear mounted placement tube assembly 162 is particularly adapted for use with a Kinze planter 164. This substantially straight rear mounted placement tube assembly 162 is similar to the John Deere device shown in FIGS. 10-11; however the attachment bracket 166 is oriented in a different direction to accommodate the Kinze planter 164. This type of placement tube assembly may be used for all SmartBox system applications on Kinze™ planters and on John Deere 7000 & 7100 series planters. For installation either the left or right gauge wheel assembly is removed. The set screw/bolt and washer on the gauge wheels mounting shaft is removed. From the bottom of the row unit, the tubes inlet opening is inserted through the hole provided at the closing wheel's hinge point. The set screw/bolt is used to fasten the tube to the row unit—the washer is not required. (If there are problems starting the bolt, a slightly longer bolt may be required.) The mounting tab on the tube may need to be adjusted so the guide foot is parallel to the ground. The gauge wheel assembly is then reinstalled. The placement tube assembly is installed as discussed above with respect to the previous embodiments.

The design is similar to the rear mount John Deere planter related placement tube assembly 134 discussed relative to FIGS. 9-12. Modifications are made to allow attachment to the Kinze planter 164.

Figure 19:
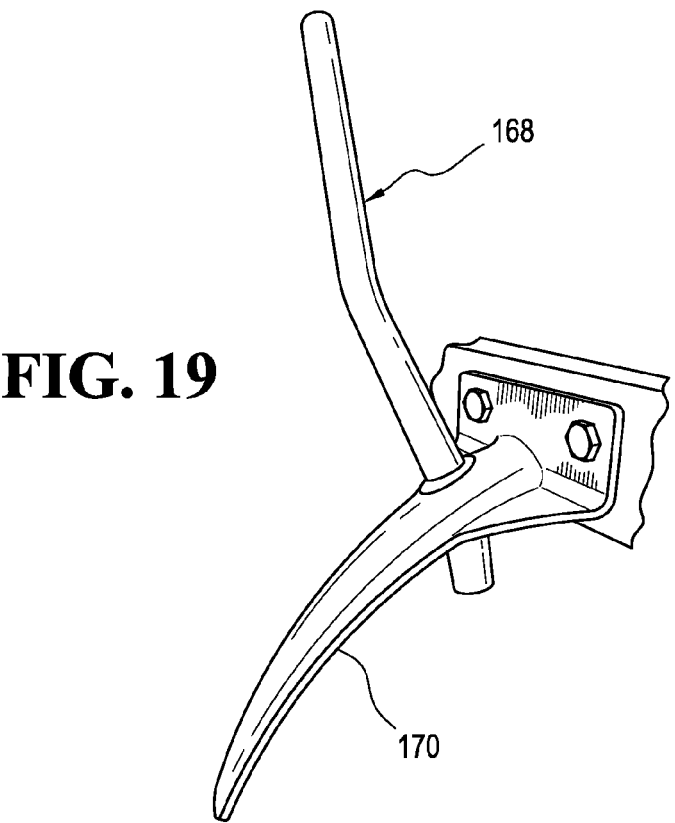
FIG. 19 is a perspective illustration of another embodiment of a front mounted placement tube assembly having a rock guard.

Referring now to FIG. 19, a rock guard equipped front mounted placement tube assembly 168 is illustrated that contains a rock guard portion 170. Placement tube assembly 168 is adapted for use with, for example, John Deere model 7200 planter.

Another type of precision placement equipment may be, for example, a bander, for generating a band of product over a furrow. Standard banders or spreaders fail to produce a good distribution pattern of granular product deposited on hillsides. The side-to-side slope of the ground affects the bandwidth and distribution pattern of the product. As the planter unit tilts on hillsides, the granule product runs toward the downhill side of the bander. At about a fifteen percent slope, all of the granule product runs out of the downhill side depositing a thin band of product downhill from the seed furrow, rather than a wide band over the seed furrow. Such conventional banders have uneven patterns on level ground, lose thirty percent to sixty percent of the effective pattern on a seven to ten percent slope, and lose sixty percent to one hundred percent of the effective pattern on a ten to twenty percent slope. Because of poor placement, agricultural products may be ineffective resulting in inefficient results, increased costs and lower crop yields. Those concerned with these and other problems recognize the need for improved granular product banders. For the low rate applications of the present invention, a 4.5 inch bander is preferably used instead of the 7-8 inch bander equipment conventionally used. Low application rate banders are generally in a range of between about 3.5 inches to 5.5 inches wide. (The bander size includes the windshield and is approximately the width of the resultant band generated.)

Figure 20:
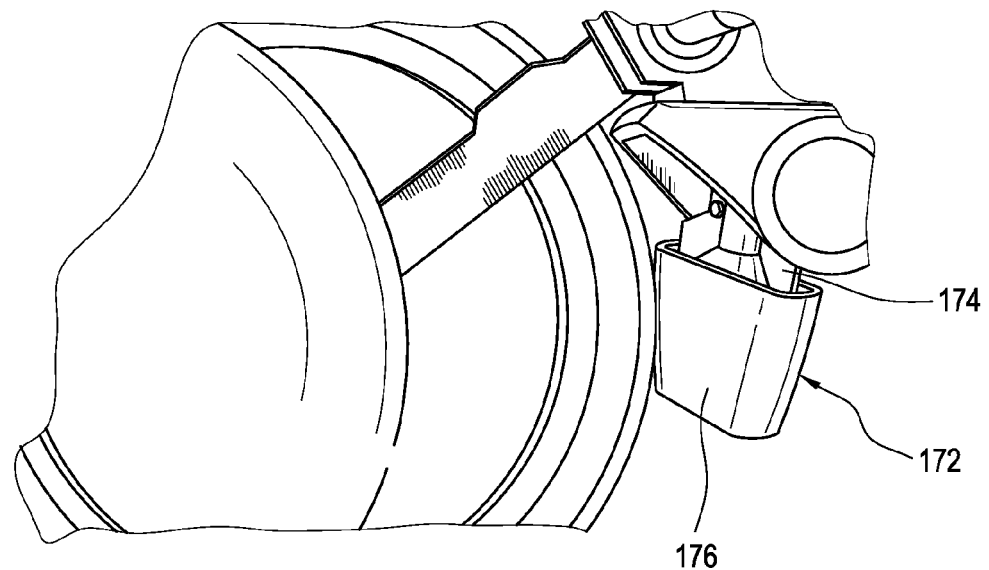
FIG. 20 illustrates a bander mounted to the frame of a dispensing planter row unit in accordance with the principles of the present invention.

Referring to FIG. 20, an example of such a bander is illustrated, designated generally as 172. In this example, an ATB™ bander manufactured for Banders & Insecticide Systems of Walker, Iowa, is shown. The ATB bander includes a bander bracket 174 and a windshield 176. ATB bander 172 is mounted behind a depth control wheel assembly and foreword of a closing wheel assembly of the planter. Low application rate banders, in accordance with the principles of the present invention, compensates for side hills to keep the band centered over the row. The windshield (or wind screen) 176 prevents the wind from blowing the product off target. Generally, product banders include a housing having an upper neck section and a lower body section. The neck section has a top opening for receiving a supply tube, and a horizontally disposed deflector plate having feed openings at each lateral side. The body section is divided into a front compartment in communication with the opening of one lateral side, and a rear compartment in communication with the opening at the other lateral side. Granular products flowing into the front and rear compartments are directed laterally away from the respective feed opening by diagonal baffles and are discharged in a band laterally off-set from the feed opening. Such a bander is disclosed in U.S. Pat. No. 4,971,255, entitled, "Granular Chemical Bander," incorporated herein by reference in its entirety.

Banders are typically located behind the seed furrow closing (opening) mechanism on a planter. When the planter is traveling over level ground, the deflector plate remains horizontal and granular product flows through the feed openings into both the front and rear compartments, and is deposited on the ground in two adjacent bands over the seed furrow. When the planter is traveling over sloping ground, the deflector plate is tilted and the granular product flows out of the low side feed opening, into the respective compartment and is deposited on the ground in a single band on the uphill side of the seed furrow.

In industry today it is very common to use a seed treatment. Fungicide or an insecticide is used to treat the seed and its amount is limited to that which can be applied to the outside of the seed. Conventional dispensing systems are generally held by this limitation of applying product on the outside of the seed as a coating. However, if product can be applied in the furrow there can be substantial advantages. The present invention provides these advantages. In this embodiment, agricultural products are not applied directly onto the seed itself as a seed treatment. Instead they are applied in the zone of the seed, i.e. in the furrow. The present inventive features provide the ability to provide this placement. The seed itself is not required to be treated. Instead, the soil is treated. Use of seed coatings result in equipment problems, germination problems/complications, reduced seed viability, length of seed storage issues, etc. With the present invention minimization of seed as a carrier is provided. Many more options are provided to the farmer obviating issues regarding storing the seed from year to year.

Although the system for dispensing agricultural products at a low rate of the present invention has been discussed relative to its placement on a planter row unit, the system can be positioned on a planter off of the row unit. It can be placed on another part of the frame of the planter due to, for example space restrictions, preventing it from being placed directly on the planter row unit.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), General Purpose Processors (GPPs), Microcontroller Units (MCUs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of some of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

As mentioned above, other embodiments and configurations may be devised without departing from the spirit of the invention and the scope of the appended claims.

The invention claimed is:

1. A process for dispensing agricultural products at a low application rate, comprising the steps of:
   a) providing a plurality of product containers containing low application rate, dry granular agricultural products wherein said product containers are rigid and are utilized in shipping, storage, and application of agricultural products, thus maintaining agricultural product integrity; and, wherein said agricultural products are selected from the set of agricultural products consisting of: insecticides, biological products, fertility products, fungicides, micro-nutrients, growth stimulants, and, RNA silencing or interference gene technology products;
   b) providing a plurality of low application rate meter devices operatively connected to said plurality of product containers configured to dispense the agricultural products from the plurality of product containers, said plurality of low application rate meter devices being mounted on planters, said low application rate being defined as a rate below 3 ounces per 1000 feet of row;
   c) providing precision placement equipment including placement tube assemblies operatively connected to said plurality of low rate meter devices to place the agricultural products in desired locations for efficient activity of the agricultural products, wherein each placement tube assembly is mounted between depth wheels of a depth control wheel assembly of the planter for placement of product in-furrow between the depth wheels; and,
   d) operating said plurality of low application rate meter devices and said precision placement equipment to dispense the agricultural products at an optimized efficiency,
   wherein each of said placement tube assemblies includes an elongated placement tube arranged so that it descends from a portion of the frame behind the depth wheels to between the depth wheels.

2. The process of claim 1, wherein said plurality of product containers comprises a plurality of sets of agricultural product containers, said process comprising:
   a) providing a system arranged and constructed to dispense said agricultural products from said plurality of sets of agricultural product containers, said system for dispensing including a master controller, a plurality of meter devices operatively connected to said agricultural product containers and configured to dispense agricultural products at metered rates from said agricultural product containers to rows in a field, wherein each of said sets of agricultural product containers is associated with a respective row in the field, and a plurality of secondary controllers for actuating the plurality of meter devices, said plurality of secondary controllers for receiving command data from the master controller and controlling the plurality of meter devices for dispensing in response to said command data; and,
   b) dispensing said agricultural products in accordance with operator defined instructions to the master controller, said operator defined instructions capable of being provided to the master controller during the planting allowing a dispensing of individual agricultural product containers to be controlled.

3. The process of claim 1, wherein said low application rate is 1.0-2.0 ounces per 1000 ft. of row.

4. The process of claim 1, wherein said low application rate is 2.0-2.99 ounces per 1000 ft. of row.

5. The process of claim 1, wherein said low application rate is below 2.0 ounces per 1000 ft. of row.

6. The process of claim 1, wherein said low application rate is 0.01-1.9 ounces per 1000 ft. of row.

7. The process of claim 1, wherein said precision placement equipment comprises banders, each bander mounted behind the depth control wheel assembly and forward of a closing wheel assembly of the planter.

8. The process of claim 1, wherein each planter includes:
   a) a master controller;
   b) a power distribution box operatively connected to the master controller and a secondary power source; and,
   c) a plurality of secondary controllers for actuating the plurality of meter devices, each secondary controller receiving command data from the master controller, via said power distribution box, and controlling the meter devices for dispensing in response to said command data.

9. The process of claim 8, wherein said master controller and said secondary controllers are configured to provide operator defined groups of rows, each of the rows in a group having an operator assigned dispensing rate and operator assigned agricultural product, said dispensing rate and the agricultural product being controllable by the operator during operation according to planting needs.

10. The process of claim 1, wherein said plurality of low application rate meter devices include orifice diameters of 0.25 inches to 0.50 inches.

11. The process of claim 1, wherein each placement tube assembly includes said elongated placement tube connected to a foot, the foot for keeping the elongated placement tube lined up with the depth control wheel assembly.

12. The process of claim 1, wherein said low application rate meter devices comprise meter diffusers.

13. A system for dispensing agricultural products at a low application rate, comprising:
   a) a plurality of product containers containing low application rate, dry, granular agricultural products, wherein said product containers are rigid and are utilized in shipping, storage, and application of agricultural products, thus maintaining agricultural product integrity; and, wherein said agricultural products are selected from the set of agricultural products consisting of: insecticides, biological products, fertility products, fungicides, micro-nutrients, growth stimulants, and, RNA silencing or interference gene technology products;

b) a plurality of low application rate meter devices operatively connected to said product containers configured to dispense the agricultural products from the plurality of product containers, said meter devices being mounted on planters, said low application rate being defined as a rate below 3 ounces per 1000 feet of row;

c) precision placement equipment including placement tube assemblies operatively connected to said plurality of low rate meter devices to place the agricultural products in the desired locations for efficient activity of the agricultural products, wherein each placement tube assembly is mounted between depth wheels of a depth control wheel assembly of the planter for placement of product in-furrow between the depth wheels; and, wherein said low rate meter devices and said precision placement equipment are operated to dispense the agricultural products at an optimized efficiency, wherein each of said placement tube assemblies includes an elongated placement tube arranged so that it descends from a portion of the frame behind the depth wheels to between the depth wheels.

14. The system of claim 13 wherein said plurality of agricultural containers comprises a plurality of sets of agricultural product containers, said system comprising:

a) a master controller;
b) said plurality of sets of agricultural product containers;
c) said plurality of meter devices operatively connected to said agricultural product containers of said plurality of sets of agricultural product containers and configured to dispense agricultural products at metered rates from said agricultural product containers to rows in a field wherein each set of said plurality of sets of agricultural product containers is associated with a respective row in the field; and,
d) a plurality of secondary controllers for actuating the plurality of meter devices, said plurality of secondary controllers for receiving command data from the master controller and controlling the plurality of meter devices for dispensing in response to said command data;

wherein agricultural product from each agricultural product container is dispensed in accordance with operator defined instructions to the master controller, said operator defined instructions capable of being provided to the master controller during the planting allowing a dispensing of individual agricultural product containers to be controlled.

15. The system of claim 14, wherein said wherein said master controller and said secondary controllers are configured to provide operator defined groups of rows, each of the rows in a group having an operator assigned dispensing rate and an operator assigned agricultural product, wherein said operator defined groups of rows comprise multiple groups of rows, said master controller and said secondary controllers being configured to control said multiple groups of rows simultaneously.

16. The system of claim 14, wherein master controller and said plurality of secondary controllers are configured to dispense forty-eight or more different agricultural products in accordance with operator needs.

17. The system of claim 14, further including a plurality of junction boxes operatively positioned between a power distribution box and said plurality of secondary controllers.

18. The system of claim 14, wherein each secondary controller is associated with one agricultural product container.

19. The system of claim 14, wherein each secondary controller is associated with at least two agricultural product containers.

20. The system of claim 14, wherein each secondary controller receives calibration data from the meter devices and uses the calibration data in combination with the command data to control said meter devices.

21. The system of claim 14, wherein each agricultural product container includes means for retaining selected operating data, the selected operating data including an identifying serial number and calibration data for meter devices of said plurality of meter devices.

22. The system of claim 14, wherein each meter device of said plurality of meter devices includes an electromechanical apparatus, an application of actuation power to said electromechanical apparatus being controlled by one of said plurality of secondary controllers.

23. The system of claim 14, wherein each of said plurality of secondary controllers, at pre-determined intervals, applies electrical power to the meter devices for a pre-determined time.

24. The system of claim 14, wherein the master controller receives input data, including type of agricultural product being dispensed and application rate for said agricultural product, and determines an electrical power application time and the time interval between such electrical power applications in response thereto.

25. The system of claim 14, wherein each secondary controller includes means for sensing the flow of agricultural product from said agricultural product container.

26. The system of claim 25, wherein each secondary controller includes an electronic circuit board, the means for sensing the flow of agricultural product being integral with the electronic circuit board.

27. The system of claim 14, wherein agricultural products are dispensed utilizing a plurality of meter devices for each of said respective rows, each meter device being operatively connected to a respective container of a set of agricultural product containers.

28. The system of claim 13, wherein an identification device is positioned in association with an agricultural product container for providing identification information to the master controller.

29. The system of claim 13, wherein a radio-frequency identification (RFID) chip is positioned in association with an agricultural product container for providing identification information to the master controller.

30. The system of claim 13, wherein a radio-frequency identification (RFID) chip is positioned in association with an agricultural product container for providing identification information to the master controller, wherein the master controller assigns the product container and its operatively connected meter device to a specific row.

31. The system of claim 13, wherein a radio-frequency identification (RFID) chip is positioned in association with an agricultural product container for providing identification information to the master controller wherein if a product identification is not for an authorized product then an operatively connected meter device will not operate.

32. The system of claim 13, wherein said low application rate meter devices are configured to operate in a range of 1.0-2.0 ounces per 1000 feet of row.

33. The system of claim 13, wherein each placement tube assembly includes said elongated placement tube connected to a foot, the foot for keeping the elongated placement tube lined up with the depth control wheel assembly.

34. The system of claim 13, wherein said low application rate meter devices comprise meter diffusers.

* * * * *